US010000084B2

(12) United States Patent
Ohta

(10) Patent No.: US 10,000,084 B2
(45) Date of Patent: Jun. 19, 2018

(54) INK SET AND RECORDING METHOD

(71) Applicant: Seiko Epson Corporation, Tokyo (JP)

(72) Inventor: Hitoshi Ohta, Shiojiri (JP)

(73) Assignee: Seiko Epson Corporation (JP)

( * ) Notice: Subject to any disclaimer, the term of this patent is extended or adjusted under 35 U.S.C. 154(b) by 0 days. days.

(21) Appl. No.: 15/373,675

(22) Filed: Dec. 9, 2016

(65) Prior Publication Data

US 2017/0165979 A1 Jun. 15, 2017

(30) Foreign Application Priority Data

Dec. 14, 2015 (JP) ................................ 2015-243300
Nov. 25, 2016 (JP) ................................ 2016-228634

(51) Int. Cl.
*G01D 11/00* (2006.01)
*B41J 2/01* (2006.01)
*B41M 7/00* (2006.01)
*B41M 5/00* (2006.01)

(52) U.S. Cl.
CPC ........... *B41M 7/009* (2013.01); *B41M 5/0023* (2013.01)

(58) Field of Classification Search
CPC . B41M 5/0023; B41M 5/0047; B41J 11/0015
USPC ......... 347/100–102; 106/31.68, 31.69, 31.89
See application file for complete search history.

(56) References Cited

U.S. PATENT DOCUMENTS 8,911,074 B2 12/2014 Ohta
9,278,547 B2 * 3/2016 Matsuhashi .......... B41M 5/0023
9,382,439 B2 * 7/2016 Okuda .................. C09D 11/40

FOREIGN PATENT DOCUMENTS

JP 2013-177526 A 9/2013
JP 2014-094495 A 5/2014

* cited by examiner

*Primary Examiner* — An Do
(74) *Attorney, Agent, or Firm* — Harness, Dickey & Pierce, P.L.C.

(57) ABSTRACT

An ink jet recording method includes forming a first ink layer by ejecting a first ink composition including water, a water-soluble organic solvent, and a solid content including at least a coloring material on a recording medium; a first drying step of evaporating 80% by mass or more of water from the first ink composition in the first ink layer; forming a second ink layer by ejecting a second ink composition including water, a water-soluble organic solvent, and a solid content including at least a coloring material on the first ink layer; and a second drying step of evaporating a volatile component of the recording medium after forming the second ink layer, in which, assuming r1 is "water-soluble organic solvent content/solid content" of the first ink composition and r2 is "water-soluble organic solvent content/solid content" of the second ink composition", "r2/r1" is 2 or less.

19 Claims, No Drawings

INK SET AND RECORDING METHOD

TECHNICAL FIELD

The present invention relates to an ink jet recording method.

BACKGROUND ART

In the ink jet recording method, small droplets of ink are ejected from fine nozzles and attached to a recording medium to carry out recording. This method is characterized by being able to record high resolution and high quality images at a high speed with a relatively inexpensive apparatus.

In recent years, research has been carried out into directly recording (printing) labels and the like for products on soft packaging films by the ink jet recording method with respect to soft packaging films such as PET films. In addition, soft packaging films have applications for packaging foods and the like and since high safety is required for such applications, it is desirable to use water-based inks for the printing described above. In the case of using water-based inks, a heat drying process may be performed after the printing.

In addition, since the target recording surface of the soft packaging film is formed of, for example, a plastic material such as polyolefin, nylon, or polyester, the surface is often transparent or translucent. Therefore, when ink jet recording is performed, a predetermined image may be formed using color ink on a layer formed of white ink called an underlayer which covers the background (refer to, for example, JP-A-2014-094495). JP-A-2013-177526 proposes a white ink for ink jet recording applicable to such an under layer.

SUMMARY OF INVENTION

Technical Problem

In the case of recording (overlap printing) by forming an underlayer using white ink and overlapping ink thereon so as to form an image using color ink, in a state in which there is a large amount of solvent in the lower layer ink, the image may bleed when the ink of the upper layer is attached. Therefore, it is conceivable to dry the lower layer and then attach the ink of the upper layer. However, drying of the ink in the lower layer improves bleeding, but cracks and peeling may occur in the obtained image.

According to the investigation of the inventor, one cause of such cracks was found to be the fact that the shrinkage ratio of the image of the lower layer and the shrinkage ratio of the image of the upper layer are different when the formed overlap printed image is finally dried. It is considered that the shrinkage ratio of the image of each layer depends on the amount of the solvent remaining in the image of each layer at the time of completion of the overlap printing step. Accordingly, it is possible to expect a reduction in the cracks by adjusting the amount of solvent remaining in each layer.

However, the overlap printed image has a laminated structure of images of two or more layers and is not a simple structure. Therefore, it was difficult to stably prevent cracking from occurring simply by adjusting the amount of residual solvent in each layer simply by drying each layer. From the investigation of the inventors based on such findings, it was found that, in order to suppress the cracking of the overlap printed image, it is important to balance many factors including the compositions of the ink forming each layer, control of the amount of residual solvent in the lower layer when forming the upper layer, and the like.

An object of some aspects of the present invention is to provide an ink jet recording method capable of forming an image obtained by overlap printing a plurality of inks and in which bleeding and cracking are suppressed.

Solution to Problem

The present invention has been made to solve at least a part of the problems described above, and can be realized as the following aspects or application examples.

One aspect of the ink jet recording method according to the present invention includes a step of forming a first ink layer by ejecting a first ink composition which includes water, a water-soluble organic solvent, and a solid content including at least a coloring material on a recording medium by an ink jet method, a first drying step of evaporating 80% by mass or more of water contained in the first ink composition in the first ink layer, a step of forming a second ink layer by ejecting a second ink composition which includes water, a water-soluble organic solvent, and a solid content including at least a coloring material on the first ink layer subjected to the first drying step by an ink jet method, and a second drying step of evaporating a volatile component on the recording medium after the step of forming a second ink layer, in which, in a case where "water-soluble organic solvent content/solid content" of the first ink composition is "r1" and "water-soluble organic solvent content/solid content" of the second ink composition" is "r2", a value of "r2/r1" is 2 or less.

In such an ink jet recording method, since the value of "r2/r1" is 2 or less, the balance of compositions of the first ink composition and the second ink composition is favorable, and the crack resistance and the like are excellent. Then, in the first drying step, in a state in which 80% by mass or more of the amount of water in the first ink layer is removed, the second ink layer is formed on the first ink layer, and the distribution and the remaining amount of the solvent in the laminated structure of the first ink layer and the second ink layer are favorable. Therefore, according to the ink jet recording method, bleeding is suppressed when forming the second ink layer and cracking of the image is suppressed in the second drying step. According to such an ink jet recording method, it is possible to form an image obtained by overlap printing a plurality of inks and in which bleeding and cracking are suppressed.

In the ink jet recording method according to the present invention, the recording medium may be a low ink absorption or non-ink absorption recording medium.

According to such an ink jet recording method, it is possible to easily form an image in which bleeding or cracking is suppressed, for example, on a soft packaging film.

In the ink jet recording method according to the present invention, the first ink composition may be a background image ink composition which includes at least one of metal compound particles and metal particles as a coloring material, and the second ink composition may be a colored ink composition which includes a non-white coloring material.

According to such an ink jet recording method, it is possible to form an image with good image quality due to the background covering property of at least one of the metal compound particles and the metal particles.

In the ink jet recording method according to the present invention, the first drying step may be performed with a surface temperature of the recording medium of 25° C. or more and 50° C. or less.

By doing so, it is possible to evaporate water in the first ink layer more easily.

In the ink jet recording method according to the present invention, the first ink composition may include resin particles as the solid content.

According to such an ink jet recording method, it is possible to form an image having more favorable adhesion to a recording medium.

In the ink jet recording method according to the present invention, the second ink composition may include resin particles as the solid content.

According to such an ink jet recording method, it is possible to form an image with more favorable adhesion between the first ink layer and the second ink layer.

In the ink jet recording method according to the present invention, the resin particles may be at least one type of urethane-based resin particles, ester-based resin particles, and acrylic-based resin particles.

According to such an ink jet recording method, it is possible to further improve at least one of adhesion to a recording medium and adhesion between ink layers to be laminated.

In the ink jet recording method according to the present invention, the first ink composition may include at least one type of urethane-based resin particles and ester-based resin particles, and the second ink composition may include at least one type of ester-based resin particles and acrylic-based resin particles.

According to such an ink jet recording method, it is possible to further improve at least one of adhesion to a recording medium and adhesion between ink layers to be laminated.

In the ink jet recording method according to the present invention, the ester-based resin particles may include a polyester resin which is a graft polymer formed of a main chain segment (A1) formed of a polyester resin and a side chain segment (A2) formed of an addition polymerization resin.

According to such an ink jet recording method, it is possible to further improve at least one of adhesion to a recording medium and adhesion between ink layers to be laminated.

In the ink jet recording method according to the present invention, "r2/r1" may be 0.5 or more and 2 or less.

According to such an ink jet recording method, since the balance of compositions of the first ink composition and the second ink composition is further improved, it is possible to easily form an image in which bleeding and cracking are further suppressed.

In the ink jet recording method according to the present invention, the first drying step may be performed with an evaporation amount of the water-soluble organic solvent contained in the first ink composition in the first ink layer of 20% by mass or less. That is, the first drying step is performed so as to create such a state.

According to such an ink jet recording method, it is possible to easily form an image in which bleeding is more suppressed.

In the ink jet recording method according to the present invention, the first drying step may be performed by at least one of heat conduction, radiation irradiation, and air blowing.

According to such an ink jet recording method, it is possible to more easily reduce the amount of water in the first ink layer.

In the ink jet recording method according to the present invention, the second drying step may be performed with a surface temperature of the recording medium at 70° C. or more.

According to such an ink jet recording method, it is possible to dry the recorded image to a state sufficient for use in a shorter time.

In the ink jet recording method according to the present invention may further include a step of forming a third ink layer by ejecting a clear ink composition which includes resin particles, a water-soluble organic solvent, and water on the second ink layer by an ink jet method after performing the second drying step.

According to such an ink jet recording method, it is possible to further improve the abrasion resistance of the recorded image.

In the ink jet recording method according to the present invention, in a case where "water-soluble organic solvent content/solid content" of the clear ink composition is "r3", a value of "r3/r1" may be 2 or less.

According to such an ink jet recording method, since the balance of compositions of the first ink composition and the clear ink composition is further improved, it is possible to easily form an image in which bleeding or cracking is further suppressed.

In the ink jet recording method according to the present invention, the step of forming a third ink layer may be performed after evaporating 80% by mass or more of all water contained in the first ink composition and the second ink composition in the second drying step.

According to such an ink jet recording method, since the clear ink composition is attached to the laminated structure of the first ink layer and the second ink layer from which at least 80% by mass of water is removed, it is possible to form an image in which bleeding is further suppressed.

In the ink jet recording method according to the present invention, a third drying step of evaporating a volatile component on the recording medium may be performed after the step of forming a third ink layer.

According to such an ink jet recording method, bleeding or cracking is suppressed and it is possible to form an image having more favorable abrasion resistance in a shorter time.

In the ink jet recording method according to the present invention, the first ink composition and the second ink composition may include 1% by mass or more and 15% by mass or less of resin particles, 3% by mass or more and 40% by mass or less of a water-soluble organic solvent, and 0.5% by mass or more and 15% by mass or less of a coloring material.

According to such an ink jet recording method, since the balance of compositions of the first ink composition and the second ink composition is further improved, it is possible to easily form an image in which bleeding and cracking are further suppressed.

In the ink jet recording method according to the present invention, the water-soluble organic solvent may include a water-soluble organic solvent with a boiling point of 250° C. or less.

According to such an ink jet recording method, it is possible to easily form an image having a favorable drying property where bleeding and cracking are further suppressed.

DESCRIPTION OF EMBODIMENTS

Description will be given below of several embodiments of the present invention. The embodiments described below illustrate one example of the present invention. The present invention is by no means limited to the following embodiments, and includes various types of modifications carried out within a range which does not depart from the gist of the present invention. Note that not all of the configurations described below are necessarily indispensable components of the present invention.

The ink jet recording method according to the present embodiment includes a step of forming a first ink layer, a first drying step, a step of forming a second ink layer, and a second drying step. Due to this, it is possible to obtain recorded material on which an image is recorded on a recording surface of a recording medium.

1. Step of Forming First Ink Layer

The step of forming a first ink layer is performed by ejecting a first ink composition including water, a water-soluble organic solvent, and solid content including at least a coloring material, on a recording medium by an ink jet method. The step of forming a first ink layer according to the present embodiment is performed by ejecting the first ink composition on a recording medium using an ink jet method. Then, the first ink layer (image) is formed in a recording region of the recording medium. The recording region of the recording medium is not particularly limited, but is a region which sets out the formation of the second ink layer (image) by the second ink composition, and the second ink composition is attached in this region. Below, description will be given of the recording medium and the first ink composition in this order, and the ink jet method will be described below in another section.

1.1. Recording Medium

The recording medium on which an image is formed by the ink jet recording method according to the present embodiment may have a recording surface which absorbs ink or may not have a recording surface which absorbs ink. Accordingly, the recording medium is not particularly limited and examples thereof include an ink-absorbing recording medium such as paper, film, or cloth, a low ink absorption recording medium such as printing paper, a non-ink absorption recording medium such as metal, glass, polymer, and the like. However, the excellent effect of the ink jet recording method of the present embodiment is more remarkable in a case of recording an image on a low ink absorption or a non-ink absorption recording medium.

The low ink absorption or non-absorption recording medium refers to a recording medium having a property of not absorbing the ink composition at all or hardly absorbing the ink composition. Quantitatively, the non-ink absorption or the low absorption recording medium indicates a "recording medium having a water absorption amount of 10 $mL/m^2$ or less from the start of contact to 30 $msec^{1/2}$ in the Bristow method". The Bristow method is the most popular method for measuring the amount of liquid absorption in a short time and is also adopted by Japan Technical Association of the Pulp and Paper Industry (JAPAN TAPPI). The details of the test method are laid out in the standard No. 51 "JAPAN TAPPI Paper Pulp Test Method 2000 Edition" under "Paper and paperboard—Liquid absorbency test method—Bristow method". On the other hand, an ink absorption recording medium refers to a recording medium which is not a non-ink absorption or low absorption recording medium.

Examples of the non-ink-absorption recording medium include a plastic film which does not have an ink absorbing layer, a medium in which plastic is coated on a base material such as paper, a medium with a plastic film bonded thereto, and the like. Examples of plastics here include polyvinyl chloride, polyethylene terephthalate, polycarbonate, polystyrene, polyurethane, polyethylene, polypropylene, and the like.

In addition, examples of the low ink absorption recording medium include a recording medium provided with a coating layer for receiving ink on the surface thereof, examples of a recording medium in which the base material is paper include printing paper such as art paper, coated paper, and matte paper, in a case where the base material is a plastic film, examples thereof include films where a hydrophilic polymer is coated on a surface of polyvinyl chloride, polyethylene terephthalate, polycarbonate, polystyrene, polyurethane, polyethylene, polypropylene, or the like, and films where particles such as silica or titanium are coated with a binder.

It is possible to favorably use the ink jet recording method according to the present embodiment for a soft packaging film. The soft packaging film is an aspect of the non-ink-absorption recording medium described above. More specifically, the soft packaging film is a highly flexible film material used for food packaging, toiletries, cosmetic packaging and the like, and is a film material in which materials having anti-fogging properties or antistatic properties, anti-oxidants, or the like are present on the film surface, and which has a thickness in the range of 5 to 70 μm (preferably 10 to 50 μm). In a case where an ink composition is recorded on this film, it is difficult to fix the ink compared to a plastic film with a normal thickness, and even if the ink is fixed, peeling is liable to occur because the ink is not able to cope with the flexibility of the film. The ink jet recording method according to the present embodiment is more suitable for a soft packaging film.

In the materials forming the recording surface of the soft packaging film, it is possible to use materials which include at least one type of resin selected from olefin-based resins (polyethylene, polypropylene, and the like), ester-based resins (polyester, and the like), vinyl chloride-based resins (polyvinyl chloride, and the like), amide-based resins (polyamide, and the like). As the film base material including the recording surface of the soft packaging film, it is possible to use materials in which these resins are processed into films or sheets. In the case of a film or sheet using a resin, it is possible to use any of an unstretched film, a stretched film stretched in a uniaxial direction or a biaxial direction, or the like, and films stretched in a biaxial direction are preferably used. In addition, it is also possible to use a film or sheet formed of each type of resin in an adhered laminated state as necessary.

Here, the recording medium may be colorless and transparent, translucent, colored and transparent, chromatic and opaque, achromatic and opaque, and the like. In addition, the recording medium itself may be colored or may be translucent or transparent. In such a case, by setting the first ink composition as the background image ink composition, it is possible for the first ink layer to function as a covering layer for covering the color of the recording medium itself. For example, when a color image is recorded as the second ink layer using the second ink composition, if a background image was previously recorded in the region for recording a color image with the background image ink composition, it may be possible to improve the color development of the color image.

1.2. First Ink Composition

The first ink composition contains at least water, a water-soluble organic solvent, and solid content including a coloring material. In a case where the first ink composition is set as a background image ink composition, for example, it is possible to use a white ink composition or a glittering ink composition.

The white ink composition is an ink capable of recording a color called "white" as commonly understood by society, including whites which are slightly colored. In addition, the ink containing the pigment includes inks named and sold under the name "white ink" or the like. Further, for example, in a case where the ink is recorded on Epson genuine photographic paper <glossy (manufactured by Seiko Epson Corp.) in an amount of 100% duty or more or sufficient for covering the surface of the photographic paper, in a case where the lightness (L*) and the chromaticity (a*, b*) of the ink are measured using a spectrophotometer Spectrolino (trade name, manufactured by Gretag-Macbeth) by setting the measurement conditions as D50 light source, an observation field of view of 2°, a concentration of DIN NB, a white standard of Abs, a filter as No, and a measurement mode as Reflectance, inks exhibiting ranges of $70 \leq L^* \leq 100$, $-4.5 \leq a^* \leq 2$, $-6 \leq b^* \leq 2.5$ are included.

The glittering ink composition refers to a composition which glitters when attached to a recording medium. In addition, the glittering property indicates a property which, for example, imparts a characteristic according to the specular glossiness of an image to be obtained (refer to Japanese Industrial Standard (JIS) Z 8741). For example, as types of glittering property, there are a glittering property which specularly reflects light, a so-called matte style glittering property, and the like, and it is possible to impart characteristics according to, for example, the high and low specular glossiness.

1.2.1. Water

The first ink composition contains water. Water is the main medium of the first ink composition and is a component which is evaporated and scattered by drying. It is preferable that the water be obtained by removing as much ionic impurities as possible such as pure water or ultrapure water such as ion exchanged water, ultra-filtered water, reverse osmosis water, or distilled water. In addition, it is preferable to use water sterilized by ultraviolet irradiation or addition of hydrogen peroxide or the like since it is possible to suppress the generation of mold and bacteria in a case where ink is stored for a long period.

The first ink composition is preferably a so-called water-based ink which includes water as the main solvent. The water-based ink has advantages in that the odor is also suppressed and the ink is good for the environment since 40% by mass or more of the composition is water. The content of water in the ink is preferably 40% by mass or more, more preferably 50% by mass or more, and even more preferably 60% by mass or more. Although not limited, the upper limit is preferably 95% by mass or less.

1.2.2. Water-Soluble Organic Solvent

The first ink composition contains a water-soluble organic solvent. The water-soluble organic solvent is not particularly limited, and examples thereof include alkyl polyols, pyrrolidone derivatives, glycol ethers, and the like. These water-soluble organic solvents may be used as one type or in a combination of two or more types. Note that, in the present specification, "water-soluble" means being provided with a property where the solubility in 100 g of water at 20° C. is 0.1 g or more.

Examples of the alkyl polyols include propylene glycol, dipropylene glycol, 1,2-butanediol, 1,2-pentanediol, 1,2-hexanediol, 1,2-heptanediol, 1,3-butylene glycol, 3-methyl-1,3-propanediol, 2-ethyl-2-methyl-1,3-propanediol, 2-methyl-1,3-propanediol, 2-methyl-2-propyl-1,3-propanediol, 2,2-dimethyl-1,3-propanediol, 2-methylpentane-2,4-diol, 3-methyl-1,5-pentanediol, and the like. Alkyl polyols have a function of enhancing the wettability of the ink with respect to the recording medium and suppressing the solidification and drying of the ink. In a case of containing alkyl polyols, it is possible to set the content thereof to 1% by mass or more and 50% by mass or less with respect to the total mass of the first ink composition.

Examples of the pyrrolidone derivatives include N-methyl-2-pyrrolidone, N-ethyl-2-pyrrolidone, N-vinyl-2-pyrrolidone, 2-pyrrolidone, N-butyl-2-pyrrolidone, 5-methyl-2-pyrrolidone, and the like. It is possible for the pyrrolidone derivative to act as a favorable dissolving agent for the resin component. In the case of containing a pyrrolidone derivative, it is possible to set the content thereof to 0.5% by mass or more and 30% by mass or less with respect to the total mass of the first ink composition.

Examples of glycol ethers include ethylene glycol monoisobutyl ether, ethylene glycol monohexyl ether, ethylene glycol monoisohexyl ether, diethylene glycol monohexyl ether, triethylene glycol monohexyl ether, diethylene glycol monoisohexyl ether, triethylene glycol monoisohexyl ether, ethylene glycol monoisoheptyl ether, diethylene glycol monoisoheptyl ether, triethylene glycol monoisoheptyl ether, ethylene glycol monooctyl ether, ethylene glycol monoisooctyl ether, diethylene glycol monoisooctyl ether, triethylene glycol monoisooctyl ether, ethylene glycol mono-2-ethylhexyl ether, diethylene glycol mono-2-ethylhexyl ether, triethylene glycol mono-2-ethylhexyl ether, diethylene glycol mono-2-ethylpentyl ether, ethylene glycol mono-2-ethylpentyl ether, ethylene glycol mono-2-ethylhexyl ether, diethylene glycol mono-2-ethylhexyl ether, ethylene glycol mono-2-methylpentyl ether, diethylene glycol mono-2-methylpentyl ether, propylene glycol monobutyl ether, dipropylene glycol monobutyl ether, tripropylene glycol monobutyl ether, propylene glycol monopropyl ether, dipropylene glycol monopropyl ether, tripropylene glycol monomethyl ether, and the like. It is possible to use these singly or as a mixture of two or more types. It is possible for glycol ethers to control the wettability and penetration rate of the ink with respect to the recording medium. In the case of containing glycol ethers, it is possible to set the content thereof to 0.05% by mass or more and 6% by mass or less with respect to the total mass of the first ink composition.

It is possible for the total content of the water-soluble organic solvent to be 1% by mass or more and 50% by mass or less, preferably 2% by mass or more and 45% by mass or less, more preferably 3% by mass or more and 40% by mass or less, and even more preferably 10% by mass or more and 35% by mass or less with respect to the total mass of the first ink composition.

Note that, in the first ink composition, the content of the water-soluble organic solvent having a normal boiling point of 280° C. or higher is preferably 3% by mass or less, more preferably 1% by mass or less, and even more preferably 0.5% by mass or less. In this case, the ink may or may not include a water-soluble organic solvent having a normal boiling point of 280° C. or more and, even in a case where the ink is included, the content is as described above or less. Setting the content of the water-soluble organic solvent having a normal boiling point of 280° C. or higher to be within the range described above makes it possible to prevent the drying property of the ink from being significantly lowered and, as a result, for example, it is possible to prevent the fixability of the image from deteriorating when performing recording on a soft packaging film. In addition, even if the temperature of the recording medium in the drying step is made to be relatively low, it is possible to sufficient carry out the drying. Examples of a water-soluble organic solvent having a normal boiling point of 280° C. or higher include glycerin (normal boiling point of 290° C.)

In addition, the water-soluble organic solvent included in the first ink composition may be used as one type or in a combination of two or more types, and among the above, it is preferable to include a water-soluble organic solvent having a normal boiling point of 250° C. or less. In addition, among the water-soluble organic solvents contained in the ink, the content of the water-soluble organic solvent having a normal boiling point of more than 250° C. is preferably 3% by mass or less, more preferably 1% by mass or less, and even more preferably 0.5% by mass or less. In this case, it is possible to keep the drying property of the ink high. The lower limit of the content of the water-soluble organic solvent having a normal boiling point of more than 250° C. is preferably 0% by mass or more, that is, the solvent may not be included.

1.2.3. Coloring Material

Examples of the coloring material include a white coloring material, a glittering pigment, and the like.

Examples of the white coloring material include metal compounds such as metal oxides, barium sulfate, and calcium carbonate. Examples of the metal compounds include titanium dioxide, zinc oxide, silica, alumina, magnesium oxide, and the like. In addition, the white coloring material includes particles having a hollow structure and the particles having a hollow structure are not particularly limited, and it is possible to use well-known particles. As the particles having a hollow structure, it is possible to preferably use the particles described in the specification of U.S. Pat. No. 4,880,465 and the like. From the viewpoint of good whiteness and abrasion resistance, it is preferable to use titanium dioxide as the white coloring material from among these.

In a case where a white coloring material is used, the content (solid content) of the white coloring material is 0.5% by mass or more and 20% by mass or less, preferably 1% by mass or more and 20% by mass or less, more preferably 5% by mass or more and 15% by mass or less, and even more preferably 7% by mass or more and 15% by mass or less with respect to the total mass of the first ink composition. When the content of the white coloring material is within the range described above, nozzle clogging or the like of the ink jet recording apparatus is not easily generated and it is possible to sufficiently satisfy the color concentration such as whiteness.

In addition, the volume-based average particle diameter of the white coloring material (referred to below as the "average particle diameter") is preferably 30 nm or more and 600 nm or less, and more preferably 200 nm or more and 400 nm or less. When the average particle diameter of the white coloring material is in the above range, the particles do not easily settle and it is possible to improve the dispersion stability, additionally, it is possible to make it difficult for nozzle clogging or the like to occur when applied to an ink jet recording apparatus. In addition, if the average particle diameter of the white coloring material is within the above range, it is possible to sufficiently satisfy the color concentration such as whiteness.

It is possible to measure the average particle diameter of the white coloring material with a particle size distribution measuring apparatus using the laser diffraction scattering method as the measurement principle. Examples of the particle size distribution measuring apparatus include a particle size distribution meter (for example, "Microtrac UPA" manufactured by Nikkiso Co., Ltd.) using the dynamic light scattering method as the measurement principle.

The glittering pigment is not particularly limited as long as it able to exhibit a glittering property when attached to a medium, and examples thereof include metal particles of alloys of one type or two or more types (also referred to as metallic pigments) selected from the group formed of aluminum, silver, gold, platinum, nickel, chromium, tin, zinc, indium, titanium, and copper, and pearl pigments having pearly luster. Representative examples of the pearl pigment include pigments having pearly luster and interference gloss such as titanium dioxide-coated mica, fish scale foil, and bismuth oxychloride. In addition, the glittering pigment may be subjected to a surface treatment for suppressing reaction with water. It is possible to form an image having excellent brightness by adding a glittering pigment into the ink.

In a case of using a glittering pigment, the content of the glittering pigment is preferably 0.5% by mass or more and 30% by mass or less, and more preferably 1% by mass or more and 15% by mass or less with respect to the total mass of the first ink composition. When the content of the glittering pigment is within the range described above, it is possible to improve the ejection stability from the nozzle of the ink jet recording apparatus and the storage stability of the glittering ink composition.

1.2.4. Resin Particles

The first ink composition may include resin particles. The resin particles have a function of improving the adhesion and abrasion resistance of the formed image.

The glass transition temperature (Tg) of the resin particles included in the first ink composition is not particularly limited, but the upper limit thereof is preferably 150° C. or less. When the Tg of the resin particles is 25° C. or more, it is possible to obtain favorable abrasion resistance while sufficiently securing the adhesion of the image to the recording medium. In addition, by setting the Tg of the resin particles is 150° C. or less, it is possible to suppress the occurrence of cracks or the like when the first ink layer is dried and to promote the film formation of the resin, thus it is possible to obtain an image with favorable adhesion and abrasion resistance.

Examples of usable resins forming the resin particles included in the first ink composition include an acrylic-based resin, a fluorene-based resin, a urethane-based resin, an olefin-based resin, a rosin modified resin, a terpene-based resin, an ester-based resin, an amide-based resin, an epoxy-based resin, a vinyl chloride-based resin, a vinyl chloride-vinyl acetate copolymer, an ethylene vinyl acetate-based resin, and the like. It is possible to use these resins as one type or in a combination of two or more types. Among these resins, from the viewpoint that it is possible to further improve the adhesion of the first ink layer to the recording medium, the material of the resin particles included in the first ink composition is more preferably at least one type selected from a urethane-based resin, an ester-based resin, and an acrylic-based resin. Note that, a urethane-acrylic resin and an ester-urethane resin may be classified as any one of a urethane resin, an acrylic resin, and an ester resin according to the main components and properties thereof. These are preferably classified as urethane resins.

The urethane-based resin is a polymer synthesized by reacting a polyisocyanate with a polyol. It is possible to perform the synthesis of the urethane-based resin using a known method.

Examples of the polyisocyanate include chain aliphatic isocyanates such as tetramethylene diisocyanate, 1,6-hexamethylene diisocyanate, dodecamethylene diisocyanate, trimethylhexamethylene diisocyanate, and lysine diisocyanate, aliphatic isocyanates having a cyclic structure such as 1,3-cyclohexylene diisocyanate, 1,4-cyclohexylene diisocyanate, hydrogenated xylylene diisocyanate, isophorone diisocyanate, 4,4'-dicyclohexylmethane diisocyanate, and 3,3'-dimethyl-4,4'-dicyclohexylmethane diisocyanate, and aromatic isocyanates such as 2,4-tolylene diisocyanate, 2,6-tolylene diisocyanate, m-phenylene diisocyanate, p-phenylene diisocyanate, 4,4'-diphenylmethane diisocyanate, 2,4'-diphenylmethane diisocyanate, 2,2'-diphenylmethane diisocyanate, 3,3'-dimethyl-4,4'-biphenylene diisocyanate, 3,3'-dimethoxy-4,4'-biphenylene diisocyanate, 3,3'-dichloro-4,4'-biphenylene diisocyanate, 1,5-naphthalene diisocyanate, 1,5-tetrahydronaphthalene diisocyanate, xylylene diisocyanate, and tetramethylxylylene diisocyanate. During synthesis of the urethane resin, the polyisocyanates described above may be used alone, or two or more types thereof may be used in combination.

Examples of the polyols include polyether polyol, polycarbonate polyol, and the like. Examples of the polyether polyols include polyethylene glycol, polypropylene glycol, polytetramethylene glycol, and the like. Examples of the polycarbonate polyols include diols such as 1,3-propanediol, 1,4-butanediol, 1,6-hexanediol, diethylene glycol, polyethylene glycol, polypropylene glycol, polytetramethylene glycol, and the like, dialkyl carbonates such as phosgene and dimethyl carbonate, and reaction products with cyclic carbonates such as ethylene carbonate.

As the urethane resin, an emulsion type resin is preferably used. Commercial products can be used as resin emulsions which include urethane-based resins and examples thereof include Superflex 740 (Tg: −34° C.), (trade name, manufactured by Dai-ichi Kogyo Seiyaku Co., Ltd.), Bondic 1940NE (Tg: less than 5° C.) (trade name, manufactured by DIC Corp.), Takelac W-6061 (Tg: 25° C.) (trade name, manufactured by Mitsui Chemicals, Inc.), and the like.

The ester-based resin is more preferably an emulsion type. Commercial products may be used as the resin emulsions which include ester-based resins and examples thereof include Ellether KA-5034 (Tg: 67° C.), KA-5071S (Tg: 67° C.), KZA-1734 (Tg: 66° C.), KZA-6034 (Tg: 72° C.), KZA-3556 (Tg: 80° C.) (all trade names, manufactured by Unitika Ltd.), and the like. Note that, the numerical values in parentheses are the glass transition temperature (Tg).

Furthermore, from the viewpoints of the ejecting property, adhesion to a recording medium, and image storability at high temperature, the ester-based resin as the resin particles used in the first ink composition is more preferably a graft polymer formed of a main chain segment (A1) formed of a polyester resin (referred to below as "polyester resin segment (A1)" or "segment (A1)") and a side chain segment (A2) formed of an addition polymerization resin (referred to below as an "addition polymerization resin segment (A2)" or "segment (A2)"). It is possible to carry out the synthesis of the ester-based resin with a known method, for example, as follows.

The main chain segment (A1) being formed of a polyester resin means that the main chain segment (A1) is derived from a polyester resin. In addition, the side chain segment (A2) being formed of an addition polymerization resin means that the side chain segment (A2) is derived from an addition polymerization resin. Furthermore, the graft polymer may have other segments in addition to the segment (A1) and the segment (A2). However, the content of the segment (A1) and the segment (A2) in the graft polymer is preferably 90% by mass or more, more preferably 95% by mass or more, and even more preferably substantially 100% by mass.

From the viewpoints of the ejecting property of the ink, adhesion to a recording medium, and image storability at high temperature, the mass ratio [segment (A1)/segment (A2)] of the segment (A1) to the segment (A2) forming the graft polymer is preferably 50/50 or more, more preferably 55/45 or more, and even more preferably 65/35 or more, and in addition, from the viewpoint of the fixability after drying the ink, preferably 95/5 or less, and more preferably 85/15 or less. In addition, the mass ratio is preferably 50/50 to 95/5, more preferably 55/45 to 95/5, even more preferably 65/35 to 85/15, and still more preferably 65/35 to 75/25.

The polyester resin segment (A1) forming the graft polymer is a resin segment obtained by condensation polymerization of an alcohol component and a carboxylic acid component. The alcohol component which is the raw material monomer of the segment (A1) preferably includes an alkylene oxide adduct of bisphenol A.

The alkylene oxide adduct of bisphenol A means the whole structure obtained by adding an oxyalkylene group to 2,2-bis (4-hydroxyphenyl) propane. The alkylene oxide adducts of bisphenol A may be used alone or in a combination of two or more types. The alkylene oxide adduct of bisphenol A is preferably a propylene oxide adduct of bisphenol A and an ethylene oxide adduct of bisphenol A, more preferably a propylene oxide adduct of bisphenol A, and it is even more preferable to use the above in combination.

The content of the alkylene oxide adduct of bisphenol A in the alcohol component which is the raw material monomer of the segment (A1) is preferably 50 mol % or more, more preferably 60 mol % or more, and even more preferably 70 mol % or more. In addition, the content of the alkylene oxide adduct of bisphenol A is preferably 90 mol % or less, more preferably 85 mol % or less, and even more preferably 80 mol % or less.

It is possible for the alcohol component which is the raw material monomer of the segment (A1) to contain the following alcohol components in addition to the alkylene oxide adduct of bisphenol A.

Specifically, examples of the alcohol component of the raw material monomer (also referred to below as "raw material monomer of the segment (A1)") from which the configuration unit of the segment (A1) is derived include ethylene glycol, propylene glycol (1,2 propanediol), glycerin, pentaerythritol, trimethylolpropane, hydrogenated bisphenol A, sorbitol, an alkylene (2 to 4 carbon atoms) oxide adduct thereof (average addition mole number 1 to 16), and the like. These alcohol components may be used alone or in a combination of two or more types. Among these, from the viewpoint of initial fixability, one type or two types of 1,2-propanediol and hydrogenated bisphenol A are preferable, from the viewpoint of ejecting property, 1,2-propanediol is more preferable, and from the viewpoint of image storability at high temperature, hydrogenated bisphenol A is more preferable. Among the above alcohol components, from the viewpoint of fixability, it is preferable to use an alkylene oxide adduct of bisphenol A in combination with hydrogenated bisphenol A, and it is more preferable to use a propylene oxide adduct of bisphenol A in combination with hydrogenated bisphenol A, and it is even more preferable to use a propylene oxide adduct of bisphenol A and an ethylene oxide adduct of bisphenol A in combination with hydrogenated bisphenol A.

The segment (A1) is a polyester resin, and a carboxylic acid component is used as a raw material monomer in addition to the alcohol component. Examples of the carboxylic acid component which is the raw material monomer of the segment (A1) include aromatic dicarboxylic acids such as phthalic acid, isophthalic acid, and terephthalic acid; aliphatic dicarboxylic acids such as adipic acid, succinic acid, succinic acid having an alkyl group and/or an alkenyl group, and allyl alcohol; alicyclic dicarboxylic acids such as cyclohexanedicarboxylic acids and decalin dicarboxylic acids; trivalent or higher polyvalent carboxylic acids such as trimellitic acid and pyromellitic acid, anhydrides of these acids and alkyls (1 to 3 carbon atoms) esters thereof, and the like.

From the viewpoints of improving the ejecting property of the ink, fixability to a recording medium, and image storability at high temperature, aromatic dicarboxylic acid and alicyclic dicarboxylic acid are preferable, and cyclohexane dicarboxylic acid and isophthalic acid are more preferable. Among these, from the viewpoint of image storability at high temperatures of the ink and fixability after drying, aromatic dicarboxylic acid is preferable, and isophthalic acid is more preferable. The carboxylic acid component may be included singly or in a combination of two or more types.

In addition, the carboxylic acid component preferably includes a carboxylic acid having a non-aromatic carbon-carbon unsaturated bond, for example, an unsaturated aliphatic carboxylic acid and/or an unsaturated alicyclic carboxylic acid.

It is possible for the portion of the carbon-carbon unsaturated bond to be a binding moiety with the segment (A2) in the graft polymer, and in such a case, the unsaturated bond becomes a saturated bond.

Examples of the carboxylic acid (unsaturated aliphatic carboxylic acid or unsaturated alicyclic carboxylic acid) having a non-aromatic carbon-carbon unsaturated bond include unsaturated aliphatic carboxylic acids such as fumaric acid, maleic acid, acrylic acid, and methacrylic acid, unsaturated alicyclic carboxylic acids such as tetrahydrophthalic acid, and the like. From the viewpoint of reactivity, fumaric acid, maleic acid, and tetrahydrophthalic acid are preferable, and fumaric acid is more preferable.

From the viewpoint of fixability after drying of the ink, the content of the carboxylic acid having a non-aromatic carbon-carbon unsaturated bond in the carboxylic acid component is preferably 5 mol % or more, more preferably 7 mol % or more, even more preferably 8 mol % or more, and still more preferably 12 mol % or more, from the viewpoint of the initial fixability of the ink, preferably 30 mol % or less, more preferably 25 mol % or less, and even more preferably 20 mol % or less, and still more preferably 18 mol % or less, and from the viewpoint of developing the effect of improving ejectability and image storability at high temperatures due to the segment (A2) by sufficiently grafting the segment (A2) while maintaining the effect of improving the fixability due to the segment (A1) is preferably 5 to 30 mol %, more preferably 7 to 25 mol %, even more preferably 8 to 20 mol %, and still more preferably 12 to 18 mol %.

From the viewpoint of improving image storability at high temperature of the ink and fixability after drying, the content of the aromatic dicarboxylic acid in the carboxylic acid component is preferably 50 mol % or more, more preferably 70 mol % or more, even more preferably 80 mol % or more, and still more preferably 82 mol % or more, and in addition, preferably 95 mol % or less, more preferably 92 mol % or less, and even more preferably 88 mol % or less.

From the viewpoint of adjusting the particle diameter of the resin particles and improving the adhesion and image storability at high temperature in the segment (A1), the molar ratio (hydroxyl group/carboxy group) of the hydroxyl group of the alcohol component to the carboxy group of the carboxylic acid component is preferably 100/90 to 100/120, more preferably 100/95 to 100/110, and even more preferably 100/100 to 100/105.

The segment (A2) forming the graft polymer is a segment formed of an addition polymerization resin formed of configuration units derived from the addition polymerizable monomer (a2) (also referred to below as "monomer (a2)"). The segment (A2) is a side chain in the graft polymer. Examples of the addition polymerizable monomer (a2) include one type or two or more types of styrenes such as styrene, methylstyrene, α-methylstyrene, β-methylstyrene, t-butylstyrene, chlorostyrene, chloromethylstyrene, methoxystyrene, styrenesulfonic acid or salts thereof; (meth)acrylic acid esters such as (meth) alkyl acrylates (1 to 18 carbon atoms), benzyl (meth)acrylate and dimethylaminoethyl (meth)acrylate; olefins such as ethylene, propylene, and butadiene; vinyl halides such as vinyl chloride; vinyl esters such as vinyl acetate and vinyl propionate; vinyl ethers such as vinyl methyl ether; vinylidene halides such as vinylidene chloride; and N-vinyl compounds such as N-vinyl pyrrolidone.

Among these, from the viewpoint of improving fixability to a recording medium and image storability at high temperature, one type or two types of styrenes and (meth)acrylic acid esters are preferable, and two types are more preferable.

The addition-polymerizable monomer having an aromatic group is preferably one type or two or more types of styrene, methylstyrene, phenoxyethylene glycol (meth)acrylate, benzyl methacrylate, and benzyl acrylate. Among these, one type or two types of styrene and phenoxyethylene glycol (meth)acrylate are preferable, and from the viewpoint of the raw material cost of the monomer, it is more preferable to include styrene, and styrene is even more preferable.

The (meth)acrylic acid ester preferably has an alkyl group having 1 to 22 carbon atoms, preferably 6 to 18 carbon atoms, and examples thereof include methyl (meth)acrylate, ethyl (meth)acrylate, (iso) propyl (meth)acrylate, (iso or tertiary) butyl (meth)acrylate, (iso) amyl (meth)acrylate, cyclohexyl (meth)acrylate, 2-ethylhexyl (meth)acrylate, (iso) octyl (meth)acrylate, (iso) decyl (meth)acrylate, (iso) dodecyl (meth)acrylate, (iso) stearyl (meth)acrylate, lauryl acrylate and the like, preferably one type or two types of 2-ethylhexyl (meth)acrylate and lauryl acrylate.

The addition polymerizable monomer (a2) is preferably a combination of at least one type of the above (meth)acrylic acid esters and styrene, and more preferably a combination of one type or two types of 2-ethylhexyl (meth)acrylate and lauryl acrylate and styrene.

From the viewpoints of the ejecting property, fixability to a recording medium, and image storability at high temperature, the content of the configuration unit derived from the addition polymerizable monomer having an aromatic group in the segment (A2) is preferably 40% by mass or more, more preferably 45% by mass or more, more preferably 50% by mass or more, more preferably 51% by mass or more, and preferably 100% by mass or less, more preferably 90% by mass or less, even more preferably 85% by mass or less, and still more preferably 80% by mass or less.

In addition, the configuration unit derived from the (meth) acrylic acid ester is preferably used in combination with styrene from the viewpoints of initial fixability and fixability after drying, and the content of the configuration unit derived from the (meth)acrylic acid ester in the segment (A2) is preferably 10% by mass or more, more preferably 15% by mass or more, and even more preferably 35% by mass or more, from the viewpoint of the ejection property, fixability to a recording medium and image storability at high temperature and preferably 60% by mass or less, more preferably 55% by mass or less, and even more preferably 50% by mass or less.

From the viewpoints of the initial fixability and the fixability after drying, the mass ratio [the total of the components having the unsaturated groups of segment (A2)/segment (A1)] of the total amount of unsaturated aliphatic carboxylic acid and unsaturated alicyclic carboxylic acid among the raw material monomers of segment (A2) and segment (A1) is preferably 1/1 to 40/1, more preferably 5/1 to 30/1, and even more preferably 10/1 to 15/1.

The acrylic resin refers to a polymer obtained by using at least one type of (meth)acrylic acid, (meth)acrylic acid ester, acrylonitrile, cyanoacrylate, and acrylamide as a monomer (also referred to below as "acrylic monomer"). The acrylic-based resin may be a homopolymer of an acrylic monomer or a copolymer with a monomer other than an acrylic monomer (for example, olefin, styrene, vinyl acetate, vinyl chloride, vinyl alcohol, vinyl ether, vinyl pyrrolidone, vinyl pyridine, vinyl carbazole, vinyl imidazole, vinylidene chloride, and the like). Note that, the copolymer described above may take any form of a random copolymer, a block copolymer, an alternating copolymer, and a graft copolymer. In the present specification, "(meth)acrylic" means at least one of acrylic and the corresponding methacrylic. It is possible to perform the synthesis of the acrylic-based resin using a known method.

Among those described above, from the viewpoint that it is possible to further improve the adhesion of the first ink layer, as the acrylic-based resin, at least one of a (meth)acrylic resin and a styrene-(meth)acrylic acid copolymer resin is preferable, at least one of an acrylic resin and a styrene-acrylic acid copolymer-based resin is more preferable, and a styrene-acrylic acid copolymer-based resin is even more preferable. In addition, the acrylic resin is more preferably supplied as an emulsion type.

Commercial products may be used as the resin emulsion containing the acrylic resin and examples thereof include Mowinyl 972 (Tg: 101° C.), 7180 (Tg: 53° C.) (all trade names, manufactured by Nippon Synthetic Chemical Industry Co., Ltd.), Joncryl 530 (Tg: 75° C.), 538 (Tg: 64° C.), 1908 (Tg: 98° C.), 1925 (Tg: 75° C.), 1992 (Tg: 78° C.) (all trade names, manufactured by BASF SE), and the like. Note that, the numerical values in parentheses are the glass transition temperature (Tg).

The total amount of the content (solid content) of the resin particles with respect to the total mass of the first ink composition in a case where a plurality of types are used is preferably 0.5% by mass or more and 20% by mass or less, and more preferably 1% by mass or more and 15% by mass or less. Setting the content of the resin particles to 0.5% by mass or more further improves the adhesion of the first ink layer to the recording medium and the adhesion to the second ink layer. In addition, by setting the content of the resin particles to 20% by mass or less, there is a tendency for the ejection property of the first ink composition from the recording head to be favorable.

1.2.5. Other Components

Wax

The first ink composition may contain wax. Since the wax is provided with a function of imparting lubrication to the first ink layer, it is possible to reduce peeling of the first ink layer and the like.

Examples of the components forming the wax include plant-animal waxes such as carnauba wax, candeli wax, beeswax, rice wax, and lanolin; petroleum type waxes such as paraffin wax, microcrystalline wax, polyethylene wax, oxidized polyethylene wax, and petrolatum wax; mineral waxes such as montan wax and ozokerite; synthetic waxes such as carbon wax, Hoechst wax, polyolefin wax, and stearic acid amide; natural and synthetic wax emulsions or mixed waxes such as α-olefin/maleic anhydride copolymer; and the like and it is possible to use these singly or as a mix of a plurality of types. Among these, from the viewpoint of being superior due to the effect of enhancing fixability to the soft packaging film described below, polyolefin waxes (particularly, polyethylene wax, polypropylene wax) and paraffin wax are preferably used.

Commercially available products can be used as waxes as they are and examples thereof include Nopcoat PEM-17 (trade name, manufactured by San Nopco Ltd.), Chemipearl W4005 (trade name, manufactured by Mitsui Chemicals, Inc.), AQUACER 515, 539, 593 (all trade names, manufactured by BYK Japan K.K.), and the like.

From the viewpoint of suppressing deterioration of the properties of the wax by excessively melting the wax in the drying step, it is preferable to use a wax where the melting point is 50° C. or more and 200° C. or less, more preferably a wax where the melting point is 70° C. or more and 180° C. or less, and even more preferably a wax where the melting point is 100° C. or more and 180° C. or less.

The wax may be supplied in the form of an emulsion, and in such a case it is possible to regard the wax as one type of resin particles. The content of the wax is preferably 0.1% by mass or more and 10% by mass or less, more preferably 0.5% by mass or more and 5% by mass or less, and even more preferably 1% by mass or more and 4% by mass or less in terms of solid content with respect to the total mass of the first ink composition. When the content of the wax is within the range described above, it is possible to favorably exhibit the function of the wax described above.

Resin Dispersant

Since the first ink composition contains a white coloring material and a glittering pigment as a coloring material, in order to apply the first ink composition to the ink jet method, it is preferable that it be possible to stably disperse and maintain the white coloring material or the glittering pigment in water. Examples of such methods include a method of dispersing with a resin dispersant such as a water-soluble resin and/or a water-dispersible resin, a method of dispersing with a dispersant, and a method of chemically/physically introducing a hydrophilic functional group to the coloring material particle surface and making dispersion and/or dissolution in water possible without the resin or a dispersant, and the like. However, among these, a method (resin dispersed pigment) of dispersing using a resin dispersant is excellent in the dispersion stability in the ink composition, the ejection stability from the head nozzle holes using the ink jet method, durability such as adhesion and abrasion resistance of the obtained image, and the like, which is preferable.

Examples of the resin dispersant include polyvinyl alcohols, polyacrylic acid, acrylic acid-acrylonitrile copolymers, vinyl acetate-acrylic acid ester copolymers, acrylic acid-acrylic acid ester copolymers, styrene-acrylic acid copolymers, styrene-methacrylic acid copolymers, styrene-methacrylic acid-acrylic acid ester copolymers, styrene-α-methylstyrene-acrylic acid copolymers, styrene-α-methylstyrene-acrylic acid-acrylic acid ester copolymers, styrene-maleic acid copolymers, styrene-maleic anhydride copolymers, vinyl naphthalene-acrylic acid copolymers, vinyl naphthalene-maleic acid copolymers, vinyl acetate-maleic acid ester copolymers, vinyl acetate-crotonone acid copolymers, vinyl acetate-acrylic acid copolymers, and the like and salts thereof. Among these, a copolymer of a monomer having a hydrophobic functional group and a monomer having a hydrophilic functional group, and a polymer formed of a monomer having both a hydrophobic functional group and a hydrophilic functional group are preferable. As the form of the copolymer, it is possible to use any of a random copolymer, a block copolymer, an alternating copolymer, and a graft copolymer.

It is possible to appropriately select the content ratio of the resin dispersant depending on the coloring material to be dispersed; however, 5 parts by mass or more and 200 parts by mass or less with respect to 100 parts by mass of the coloring material content in the first ink composition is preferable, and 20 parts by mass or more and 120 parts by mass or less is more preferable.

Surfactant

The first ink composition may contain a surfactant. The surfactant has a function of lowering the surface tension and improving the wettability with the recording medium. Among surfactants, it is possible to preferably use, for example, acetylene glycol-based surfactant, silicone-based surfactant, and fluorine-based surfactant.

The acetylene glycol-based surfactant is not particularly limited, but examples thereof include Surfynol 104, 104E, 104H, 104A, 104BC, 104DPM, 104PA, 104PG-50, 104S, 420, 440, 465, 485, SE, SE-F, 504, 61, DF37, CT111, CT121, CT131, CT136, TG, GA, DF110D (all trade names, manufactured by Air Products and Chemicals, Inc.), OLFINE B, Y, P, A, STG, SPC, E1004, E1010, PD-001, PD-002W, PD-003, PD-004, EXP. 4001, EXP. 4036, EXP. 4051, AF-103, AF-104, AK-02, SK-14, AE-3 (all trade names, manufactured by Nissin Chemical Industry Co., Ltd.), Acetylenol E00, E00P, E40, E100 (all trade names, manufactured by Kawaken Fine Chemicals Co., Ltd.).

The silicone-based surfactant is not particularly limited, and examples thereof include polysiloxane-based compounds. The polysiloxane-based compound is not particularly limited, and examples thereof include a polyether-modified organosiloxane. Examples of commercially available products of the polyether-modified organosiloxane include BYK-306, BYK-307, BYK-333, BYK-341, BYK-345, BYK-346, BYK-348 (all trade names, manufactured by BYK Japan K.K.), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all trade names, manufactured by Shin-Etsu Chemical Co., Ltd.).

A fluorine-modified polymer is preferably used as the fluorine-based surfactant and specific examples thereof include BYK-340 (trade name, manufactured by BYK Japan K.K.).

In the case of containing a surfactant, the content thereof is preferably 0.1% by mass or more and 2% by mass or less, more preferably 0.2% by mass or more and 1.5% by mass or less, and more preferably 0.5% by mass or more and 1.2% by mass or less with respect to the total mass of the first ink composition.

Other Components

The first ink composition may contain a pH adjuster, an antiseptic/fungicide agent, a chelating agent, a rust inhibitor, and the like, as necessary. Examples of the pH adjuster include potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, sodium bicarbonate and the like. Examples of antiseptic/fungicide agents include sodium benzoate, sodium pentachlorophenol, sodium 2-pyridinethiol-1-oxide, sodium sorbate, sodium dehydroacetate, 1,2-dibenzisothiazolin-3-one, and the like. Examples of commercially available products include Proxel XL 2, Proxel GXL (all trade names, manufactured by Avecia), Denicide CSA, NS-500W (all trade names, manufactured by Nagase ChemteX Corp.), and the like. Examples of the chelating agents include ethylenediamine tetraacetate, iminodisuccinate and the like. Examples of the rust inhibitor include benzotriazole and the like.

1.3. Solid Content

The solid content in the first ink composition is a coloring material, a resin dispersant, resin particles, a chelating agent, a rust inhibitor, and the like present in the ink composition, and represents a component which does not volatilize and evaporate in the second drying step as a post-drying step to be described below. That is, the solid content represents a component other than a volatile component which is water/water-soluble organic solvent or the like. On the other hand, the volatile component is a component which is not solid content but is a component which is evaporated and volatilized in the second drying step as a post-drying step, and other components which evaporate and volatilize in the second drying step as a post-drying step among other components such as water, a water-soluble organic solvent, a surfactant, and a pH adjuster.

1.4. Water-Soluble Organic Solvent Content/Solid Content r1

As described above, the first ink composition of the present embodiment includes a water-soluble organic solvent and a solid content. Therefore, it is possible to define "r1" as "water-soluble organic solvent content/solid content". "r1" has a specific relationship to be described below with "r2" of a second ink composition to be described below.

2. First Drying Step

The ink jet recording method according to the present embodiment has a first drying step of drying the first ink layer.

The first drying step is a step of drying the first ink composition (image) on the recording medium after the step of forming a first ink layer. In the first drying step, water contained in the first ink composition (first ink layer) attached on the recording medium is evaporated by 80% by mass or more. The evaporation amount (evaporated amount) of water contained in the first ink layer in the first drying step is preferably 85% by mass or more, more preferably 90% by mass or more, and even more preferably 95% by mass or more. The evaporation amount of the water contained in the first ink layer in the first drying step is 100% by mass or less, preferably less than 100% by mass, and more preferably 98% by mass or less. In terms of excellent ejection stability of the head and being able to shorten the time of the first drying step, the evaporation amount is preferably 95% by mass or less, more preferably 90% by mass or less, and even more preferably 85% by mass or less.

A case where the water evaporation rate of the first ink in the first drying step is high is preferable in terms of excellent crack resistance. On the other hand, a case where the moisture evaporation rate of the first ink in the first drying step is low is preferable in terms of it being possible for the surface temperature of the recording medium in the first drying step to be relatively low and to reduce ejection failures of the ink jet head, and shortening the time necessary for the first drying step. Accordingly, in a case where it is intended to reduce the ejection failures in the ink jet head and shorten the time necessary for the first drying step, the recording method of the present embodiment is particularly effective.

Here, it is possible to measure the evaporation amount of water or the water-soluble organic solvent in the present embodiment, for example, as follows. That is, it is possible to carry out measurement, for example, by setting the mass of ink droplets of the first ink composition ejected to form the first ink layer to be 100% and performing analysis by collecting a sample immediately after the first drying step is completed for the formed first ink layer and using one or a combination of, for example, thermogravimetric analysis (TGA), gas chromatography (GC), liquid chromatography (LC), a water content meter in the case of water, or the like.

In the first drying step, a volatile component other than water, specifically, a water-soluble organic solvent in the first ink composition, or the like may be evaporated. For example, it is preferable that the first drying step be performed so that the evaporation amount of the water-soluble organic solvent contained in the first ink composition in the first ink layer be 50% by mass or less. In addition, in such a case, in the first drying step, the evaporation amount of the water-soluble organic solvent contained in the first ink composition in the first ink layer is preferably 30% by mass or less, more preferably 25% by mass or less, even more preferably 20% by mass or less, particularly preferably 15% by mass or less, still more preferably 10% by mass or less, yet more preferably 5% by mass or less, and even more particularly preferably 3% by mass or less. Note that, in the first drying step, the lower limit of the evaporation amount of the water-soluble organic solvent contained in the first ink composition in the first ink layer is 0% by mass, and in this case, volatile components other than water-soluble organic solvent or the like such as water will be volatilized. Due to this, it is possible to obtain a high-quality image in a short time even on a non-ink-absorption recording medium such as a plastic film which does not have an ink absorption layer. In addition, even in a case where the surface temperature of the recording medium in the first drying step is relatively low, there is a tendency for the evaporation amount of the water to more easily be 80% by mass or more and, in this case, in the step of forming a first ink layer, it is possible to reduce the adverse influence such as clogging of the nozzle holes of the recording head due to heat received from the recording medium, which is preferable.

The first drying step is not particularly limited as long as it is a method of promoting the evaporation of water present in the ink. Examples of the method used in the first drying step include a method of adding heat to the recording medium, a method of blowing air onto the image on the recording medium after the step of forming a first ink layer, a method combining the above, and the like. Specifically, as the means used in these methods, for example, forced air heating, radiation heating, conductive heating, high frequency drying, microwave drying, and the like are preferably used. The drying may be drying by being left to stand.

In addition, the first drying step may be performed by heating and blowing air (that is, warm air), or may be performed by a combination of the air blowing means and the heating means described above. Examples of a means for blowing air include a known drying apparatus such as a dryer.

In addition, in the first drying step, air blowing may be performed while heating the recording surface as necessary. For the air blowing in the first drying step, the blowing speed is 0.1 m/s or more and 5 m/s or less, the blowing speed is preferably 0.2 m/s or more and 3 m/s or less, the blowing speed is more preferably 0.3 m/s or more and 2 m/s or less, and the blowing speed is more preferably 0.5 m/s or more and 1 m/s or less. Within this range, it is possible to reduce image distortion due to wind while the drying is proceeding. Within such a range, it is possible to easily evaporate water contained in the first ink layer by 80% by mass or more.

In addition, “air blowing” in the present embodiment includes blowing air onto the ink layer provided on the recording surface, and allowing wind to pass over the surface of the recording surface without directly blowing air onto the ink layer (that is, generating an airflow near the surface of the recording surface).

It is possible to perform the first drying step at at least one timing of before, during, or after ejection of the first ink composition.

The first drying step preferably includes air blowing, due to which it is possible to effectively evaporate (volatilize) water included in the first ink layer.

The surface temperature of the recording medium in the first drying step is preferably 50° C. or less, more preferably 45° C. or less, and even more preferably 40° C. or less. The surface temperature of the recording medium in the first drying step is preferably 25° C. or more, more preferably 30° C. or more, and even more preferably 35° C. or more. Within such a range, it is possible to easily evaporate water contained in the first ink layer by 80% by mass or more. Furthermore, the surface temperature of the recording medium in the first drying step is preferably a temperature lower than the surface temperature of the recording medium in the second drying step to be described below. By doing so, it is possible to suppress the flow of the resin component in the second drying step. Note that, in the present embodiment, in a case where the first drying step is performed using a plurality of mechanisms, such as a case of combining a plurality of forced air heating, radiant heating, conductive heating, high frequency drying, microwave drying, and the like, it is also possible to set different temperatures to be achieved by each mechanism. In such a case, the highest surface temperature of the recording medium is defined as the temperature of the first drying step. The same also applies to the second drying step and the third drying step.

In addition, the drying time in the first drying step (that is, the time for performing air blowing and heating) is not particularly limited as long as the time is set so that the drying rate of each layer falls within a range to be described below. However, the drying time in the first drying step (that is, the time for performing air blowing, heating, and the like) depends on the composition of the first ink composition and is, for example, 0.1 seconds or more and 100 seconds or less, preferably 0.2 seconds or more and 50 seconds or less, more preferably 0.5 seconds or more and 30 seconds or less, and even more preferably 1 second or more and 10 seconds or less. Within such a range, it is possible to easily evaporate water contained in the first ink layer by 80% by mass or more.

Note that, in the first drying step, with “evaporate 80% by mass or more of water”, most of the water-soluble organic solvent may remain unevaporated at this time. In particular, in a case where the first drying step is carried out under a relatively low temperature condition of 50° C. or less, preferably 40° C. or less, water is mainly evaporated instead of the water-soluble organic solvent, and the water-soluble organic solvent is often slightly or not at all evaporated. However, by performing the first drying step at the temperature and time described above, there is an advantage in terms of simplifying the drying mechanism provided in the apparatus and shortening the necessary time for recording.

3. Step of Forming Second Ink Layer

The step of forming a second ink layer is performed by ejecting a second ink composition which includes water, a water-soluble organic solvent, and solid content including at least a coloring material on the first ink layer subjected to the first drying step using the ink jet method.

The first ink layer subjected to the first drying step has a water content of less than 20% by mass. Therefore, even when the second ink composition is adhered, bleeding of the obtained image occurs less easily. In this step, the second ink composition is ejected by the ink jet method. Since the ink jet method is the same as in the step of forming a first ink layer described above, description thereof will be omitted. Note that the ink jet recording apparatus which attaches the second ink composition and the ink jet recording apparatus which attaches the first ink composition may be the same or different. In addition, in a case of being the same, it is possible to eject each ink composition at appropriate timings from different recording heads and/or nozzles of the ink jet recording apparatus being used. Description will be given below of the second ink composition.

3.1. Second Ink Composition

The second ink composition contains at least water, a water-soluble organic solvent, and solid content including a coloring material. In a case where the second ink composition is used as a coloring ink composition which includes a non-white coloring material, it is possible for the second ink composition to be, for example, a color ink composition or a black ink composition.

3.1.1. Water

The second ink composition contains water. Water is the main medium of the second ink composition and is a component which evaporates and scatters by drying. Since the water is the same as that of the first ink composition, description thereof will be omitted.

It is possible for the second ink composition to be preferably used as the water-based ink described above.

3.1.2. Water-Soluble Organic Solvent

The second ink composition contains a water-soluble organic solvent. The water-soluble organic solvent is not particularly limited, and examples thereof include alkyl polyols, pyrrolidone derivatives, glycol ethers, and the like. These organic solvents may be used as one type, or two or more types may be used in combination. Note that since the specific examples, effects, content ranges and the like of each of the organic solvents are the same as those described for the first ink composition, and description thereof will be omitted.

Similarly to the first ink composition, in the second ink composition, the content of the water-soluble organic solvent having a normal boiling point of 280° C. or more is preferably 3% by mass or less, more preferably 1% by mass or less, and even more preferably 0.5% by mass or less. Setting the content of the water-soluble organic solvent having a normal boiling point exceeding 280° C. within the range described above makes it possible to maintain the drying property of the ink layer to be high.

3.1.3. Coloring Material

The second ink composition contains a non-white (color) coloring material. The non-white coloring material means a coloring material other than the white coloring material and the glittering pigment described above. Examples of the non-white coloring material include dyes, pigments, and the like.

It is possible to suitably use the dyes and pigments, described in U.S. Patent Application Publication No. 2010/0086690, U.S. Patent Application Publication No. 2005/0235870, International Publication No. 2011/027842, and the like. Between dyes and pigments, it is more preferable to include a pigment. The pigment is preferably an organic pigment from the viewpoint of storage stability such as light fastness, weather resistance, and gas resistance.

Specifically, as the pigments, azo pigments such as insoluble azo pigments, condensed azo pigments, azo lakes, and chelate azo pigments; polycyclic pigments such as phthalocyanine pigments, perylene and perinone pigments, anthraquinone pigments, quinacridone pigments, dioxane pigments, thioindigo pigments, isoindolinone pigments, and quinophthalone pigment; dye chelates, dye lakes, nitro pigments, nitroso pigments, aniline black, daylight fluorescent pigments, carbon black, and the like may be used. It is also possible to use the pigments described above as one type or in a combination of two or more types.

In addition, as the dye, it is possible to use various dyes used in normal ink jet recording such as direct dyes, acidic dyes, edible dyes, basic dyes, reactive dyes, disperse dyes, vat dyes, soluble vat dyes, and reactive disperse dyes.

The content of the non-white coloring material is preferably 0.3% by mass or more and 20% by mass or less, and more preferably 0.5% by mass or more and 15% by mass or less with respect to the total mass of the second ink composition.

3.1.4. Resin Particles

The second ink composition may contain at least one type of the resin particles described in the first ink composition. As the resin forming the resin particles included in the second ink composition, it is possible to use acrylic-based resins, fluorene-based resins, urethane-based resins, olefin-based resins, rosin modified resins, terpene-based resins, ester-based resins, amide-based resins, epoxy-based resins, vinyl chloride-based resins, vinyl chloride-vinyl acetate copolymers, ethylene vinyl acetate-based resins, and the like. It is possible to use these resins as one type or in a combination of two or more types. In addition, among these resins, the material of the resin particles included in the second ink composition is more preferably at least one type selected from ester-based resins and acrylic-based resins from the viewpoint of further improving at least one of the adhesion of the second ink layer to the first ink layer and the abrasion resistance of the second ink layer. Furthermore, it is more preferable when the material of the resin particles included in the first ink composition is the same as the material of the resin particles included in the second ink layer from the viewpoint of being able to further improve the adhesion of the second ink layer to the first ink layer.

3.1.5. Other Components

The second ink composition may contain a resin dispersant, a wax, a surfactant, a pH adjuster, an antiseptic/fungicide, a chelating agent, a rust inhibitor, and the like. Note that, in the second ink composition, the resin dispersant is effectively used for the pigment. In addition, for the second ink composition, it is possible to use any of a resin dispersed pigment, a dispersant dispersed pigment, and a surface treated pigment, and it is also possible to use these in the form of a mixture of plural types as necessary; however, it is preferable to contain a resin dispersed pigment.

Specific examples of the components such as a resin dispersant, a wax, a surfactant, a pH adjuster, an antiseptic/fungicide, a rust inhibitor, and the like which are able to be used in the second ink composition, the effects of each agent, the content ranges thereof, and the like are the same as in the contents described for the first ink composition, thus description thereof will be omitted.

3.2. Solid Content

As in the first ink composition described above, the solid content in the second ink composition represents components which are not volatilized and evaporated in the second drying step as a post-drying step to be described below, that is, components other than volatile components such as water/water-soluble organic solvent, such as a coloring material, a resin dispersant, resin particles, a chelating agent, a rust inhibitor, or the like present in the ink composition.

3.3. Water-Soluble Organic Solvent Content/Solid Content r2

As described above, the second ink composition of the present embodiment includes a water-soluble organic solvent and solid content. Therefore, it is possible to define "r2" as "water-soluble organic solvent content/solid content". "r2" has a specific relationship to be described below with "r1" of the first ink composition described above.

4. Second Drying Step

The ink jet recording method according to the present embodiment has a second drying step of evaporating volatile components on the recording medium after the step of forming a second ink layer. In the second drying step, the volatile components (water, alkylpolyol, glycol ether, and the like) included in the first ink layer and the second ink layer are evaporated; however, after forming the other ink layers (for example, a third ink layer to be described below), there may be a final drying step of evaporating the remaining volatile components on the entirety of the recording medium. For example, the second drying step may have the same drying function as the first drying step, or the second drying step may be performed under the same conditions as the first drying step. In addition, for example, the second drying step may function as a final drying step, and may be performed under conditions in which drying is easier than in the first drying step, for example, a condition in which the surface temperature of the recording medium is higher or a condition in which the time of the drying step is longer. That is, the second drying step may be a second first drying step (may be referred to as "first drying step 2" in the present specification), or may be a final drying step (may be referred to as "post-drying step" in the present specification).

4.1. Post-Drying Step

In a case where the second drying step is a post-drying step, in the second drying step, volatile components (water, alkyl polyol, glycol ether, and the like) included in the first ink layer and the second ink layer are evaporated and dried to a state in which the recorded material is usable.

Even in a case where the second drying step is a post-drying step, in the drying performed in the second drying step, since at least the first ink layer is dried to a predetermined water content by the first drying step, it is possible to suppress the flow of ink droplets forming the second ink layer. Due to this, since it is possible to retain the ink droplets of the second ink composition at the positions where the ink droplets are attached, it is possible to suppress bleeding of the image caused by excessively mixing the components included in each layer.

In a case where the second drying step is a post-drying step, the second drying step is performed under a condition in which it is easier to dry the volatile components than in the first drying step. In this case, the method used in the second drying step is not particularly limited as long as it is a method in which the means which is used promotes the evaporation of the volatile components present in the ink; however, in a case of using the same method as the method used in the first drying step (for example, a method of applying heat to a recording medium, a method of blowing air onto an image on a recording medium, a method of combining the above, or the like), the method is preferably performed with a higher temperature and/or a higher air flow rate than the first heating step.

For example, in a case where the second drying step is a post-drying step, air blowing may be performed while heating the recording surface. In this case, the air blowing in the second drying step is preferably performed at an air speed of 5 m/s or more, and an air speed of 6 m/s or more and 50 m/s or less, preferably an air speed of 6 m/s or more and 40 m/s or less, and more preferably an air speed of 7 m/s or more and 30 m/s or less. Performing the drying at an air speed of 6 m/s or more makes it possible to improve the evaporation speed of the liquid medium, and performing the drying at an air speed of 50 m/s or less makes it possible to reduce disturbances in the image due to the wind while maintaining the drying property. Furthermore, in this case, the surface temperature of the recording medium in the second drying step is preferably 60° C. or more, more preferably 70° C. or more, and even more preferably 80° C. or more. Furthermore, in this case, the surface temperature of the recording medium in the second drying step is preferably a higher temperature than the surface temperature of the recording medium in the first drying step described above. In addition, in a case where the second drying step is a post-drying step, the surface temperature of the recording medium in the second drying step is preferably 150° C. or less, and more preferably 130° C. or less.

In a case where the second drying step is a post-drying step, the drying time in the second drying step (that is, the time for performing air blowing and heating) is preferably twice or more the drying time in the first drying step, more preferably 3 times or more, and even more preferably 3 times or more and 30 times or less. In this manner, by setting the drying time in the second drying step to be twice or more the drying time in the first drying step, the evaporation of volatile components is sufficiently performed, thus it is possible to obtain an image excellent in abrasion resistance. In addition, by setting the drying time to 30 times or less, it is possible to shorten the drying time while sufficiently evaporating the liquid medium.

4.2. First Drying Step 2

In a case where the second drying step is the second first drying step (first drying step 2), in the second drying step, the volatile components included in the first ink layer and the second ink layer (water, alkylpolyol, glycol ether, and the like) are evaporated, bleeding is suppressed when forming other ink layers (for example, a third ink layer described below), and the remaining volatile components on the entirety of the recording medium are evaporated to the extent that cracks are not easily caused.

Even in a case where the second drying step is the first drying step 2, in the drying performed in the second drying step, since at least the first ink layer is dried to a predetermined water content by the first drying step, it is possible to suppress the flow of ink droplets forming the second ink layer. Due to this, since it is possible to retain the ink droplets of the second ink composition at the positions where the ink droplets are attached, it is possible to suppress bleeding of the image caused by excessively mixing the components included in each layer.

In the case where the second drying step is the first drying step 2, the second drying step may be performed under the same conditions as the first drying step. That is, it is possible to make the second drying step be a step in which the first ink composition and the second ink composition (image) on the recording medium are dried to prepare for the attachment of the third ink composition after the step of forming a second ink layer. In this case, in the second drying step, it is preferable that at least 80% by mass of the water contained in the first ink composition and the second ink composition attached on the recording medium be evaporated. In this case, the evaporation amount of water contained in the first ink layer and the second ink layer in the second drying step is preferably 85% by mass or more, more preferably 90% by mass or more, and even more preferably 95% by mass or more. In addition, also in this case, it is preferable that the evaporation amount of the water contained in the first ink layer and the second ink layer in the second drying step be less than 100%.

In the case where the second drying step is the first drying step 2, in the second drying step, volatile components other than water, specifically, the water-soluble organic solvent and the like in the first ink composition and the second ink composition, may be evaporated. For example, in the case where the second drying step is the first drying step 2, as in the first drying step described above, the second drying step is preferably performed such that the evaporation amount of the total water-soluble organic solvent contained in the first ink composition and the second ink composition in the first ink layer and the second ink layer is 50% by mass or less. In addition, in such a case, in the second drying step, the evaporation amount of the total water-soluble organic solvent contained in the first ink composition and the second ink composition is preferably 30% by mass or less, more preferably 25% by mass or less, even more preferably 20% by mass or less, particularly preferably 15% by mass or less, still more preferably 10% by mass or less, yet more preferably 5% by mass or less, and even more particularly preferably 3% by mass or less. Note that, in this case, in the second drying step, the lower limit of the evaporation amount of the total water-soluble organic solvent contained in the first ink composition and the second ink composition is 0% by mass, and in this case, volatile components other than the water-soluble organic solvent such as water are volatilized. Due to this, it is possible to obtain a high-quality image in a short time even on a non-ink-absorption recording medium such as a plastic film which does not have an ink absorption layer.

In addition, even in a case where the second drying step is the first drying step 2, the second drying step is not particularly limited as long as it is a method of promoting the evaporation of water present in the ink. Examples of the method used in the first drying step include a method of adding heat to the recording medium, a method of blowing air onto the image on the recording medium after the step of forming a first ink layer, a method combining the above, and the like. Specifically, as the means used in these methods, for example, forced air heating, radiation heating, conductive heating, high frequency drying, microwave drying, and the like are preferably used.

In addition, in the case where the second drying step is the first drying step 2, the second drying step may be performed by heating and blowing air (that is, warm air), or may be performed by a combination of the blowing means and the heating means described above. Examples of a means for blowing air include a known drying apparatus such as a dryer. In this case, in the second drying step, air blowing may be performed while heating the recording surface as necessary. The air speed, the surface temperature of the recording medium, the drying time, and the like are the same as in the first drying step described above.

Note that, in the case where the second drying step is the first drying step 2, "evaporate at least 80% by mass of water" may be a case where most of the water-soluble organic solvent remains unevaporated. In particular, in a case where the second drying step (first drying step 2) is carried out under conditions of a relatively low temperature of 50° C. or less, preferably 40° C. or less, the water is mainly evaporated instead of the water-soluble organic solvent, and the water-soluble organic solvent is often slightly evaporated or not at all. However, by performing the second drying step at the temperature and for the time described above, there is an advantage in terms of simplifying the drying mechanism provided in the apparatus and shortening the necessary time for recording.

In addition, in a case where the second drying step is the first drying step 2, this step may be the final drying step, and thereafter, drying may be carried out to a state in which it is possible to use the recorded material by natural drying, and furthermore, a post-drying step may be carried out to dry the recorded material to a usable state.

5. Value of "r2/r1"

In the ink jet recording method of the present embodiment, in a case where "water-soluble organic solvent content/solid content" of the first ink composition is "r1" and "water-soluble organic solvent content/solid content" of the second ink composition" is "r2", the value of "r2/r1" is 2 or less. By doing so, the composition balance of the first ink composition and the second ink composition is favorable. That is, since the value of "r2/r1" is 2 or less, the distribution and remaining amount of the solvent in the laminated structure of the lower layer image (for example, the first ink layer) and the upper layer (for example, the second ink layer) are favorable and when finally drying the formed image (for example, in the second drying step), the shrinkage rate of the image of the lower layer (for example, the first ink layer) and the shrinkage rate of the image of the upper layer (for example, the second ink layer) do not differ greatly. Due to this, cracks in the obtained image are suppressed.

Such an effect is obtained in a case where the value of "r2/r1" is 2 or less, but the value of "r2/r1" is preferably 1.8 or less, and more preferably 1.5 or less. In addition, the lower limit value of the value of "r2/r1" may be any value greater than 0, preferably 0.5 or more, more preferably 0.7 or more, and even more preferably 1 or more.

6. Operation and Effect

In such an ink jet recording method, since the value of "r2/r1" is 2 or less, the composition balance of the first ink composition and the second ink composition is favorable. Then, due to the first drying step, the amount of water in the first ink layer is reduced, the second ink layer is formed on the first ink layer, and the distribution and residual amount of the solvent in the laminated structure of the first ink layer and the second ink layer are favorable. Therefore, according to the ink jet recording method, bleeding is suppressed when forming the second ink layer and cracking of the image is suppressed in the second drying step. According to the ink jet recording method, it is possible to form an image obtained by overlap printing a plurality of inks and in which both bleeding and cracking are suppressed.

7. Other Steps 7.1. Step of Forming Third Ink Layer

The ink jet recording method of the present embodiment may include a step of forming a third ink layer by ejecting a clear ink composition including resin particles, a water-soluble organic solvent, and water by an ink jet method on the second ink layer after performing the second drying step (the "second first drying step (first drying step 2)" described above. The third ink layer is formed on the second ink layer, but may be formed on a region of the first ink layer where the second ink layer is not formed, or may be formed on a region where the first ink layer is not formed on the recording medium.

The third ink layer is formed of a clear ink composition and has a function of a protective layer for protecting the image formed on the recording medium. Forming the third ink layer makes it possible to further improve the abrasion resistance of the image.

In a case where this step is carried out, the clear ink composition is ejected by an ink jet method. Since the ink jet method is the same as in the step of forming a first ink layer described above, description thereof will be omitted. Note that, the ink jet recording apparatus for attaching the clear ink composition and the ink jet recording apparatus for attaching the first ink composition and/or the second ink composition may be the same or different. In addition, in a case of being the same, it is possible to eject each ink composition at appropriate timings from different recording heads and/or nozzles of the ink jet recording apparatus being used.

In addition, in a case where a step of forming a third ink layer is performed, the second drying step is set as the second first drying step (first drying step 2) and may be performed after evaporating 80% by mass or more of all water contained in the first ink composition and the second ink composition. By doing so, the target to which clear ink is to be attached (at least one type of the recording medium, the first ink layer, and the second ink layer) has a water content of less than 20% by mass. Therefore, even when the clear ink composition is attached, bleeding of the obtained image is less likely.

7.1.1. Clear Ink Composition

The clear ink composition contains at least resin particles, a water-soluble organic solvent, and water. It is possible for the clear ink composition to be a topcoat ink composition which does not contain a coloring material. The clear ink composition is not an ink composition used to color the recording medium but is an ink composition used for adjusting the qualities such as the glossiness, abrasion resistance, and adhesion of the recorded material, and the content of the coloring material is preferably 0.1% by mass or less, and more preferably 0.05% by mass or less. The content is most preferably 0% by mass, that is, a form which does not include a coloring material at all.

7.1.2. Resin Particles

The clear ink composition contains at least one type of resin particles described in the first ink composition. Examples of the resin forming the resin particles included in the clear ink composition include acrylic-based resins, fluorene-based resins, urethane-based resins, olefin-based resins, rosin modified resins, terpene-based resins, ester-based resins, amide-based resins, epoxy-based resins, vinyl chloride-based resins, vinyl chloride-vinyl acetate copolymers, ethylene vinyl acetate-based resins, and the like. It is possible to use these resins as one type or in a combination of two or more types. In addition, among these resins, the material of the resin particles included in the clear ink composition is more preferably at least one type selected from an ester-based resin and an acrylic-based resin from the viewpoint that it is possible to further improve at least one of the adhesion of at least one layer of the recording medium of the third ink layer, the first ink layer, and the second ink layer, and the abrasion resistance of the third ink layer. Furthermore, it is more preferable when the material of the resin particles included in the clear ink composition is the same as the material of the resin particles included in the first ink layer or the second ink layer coming into contact with the third ink layer from the viewpoint that it is possible to further improve the adhesion with the ink layer coming into contact with the third ink layer.

7.1.3. Water-Soluble Organic Solvent

The clear ink composition contains a water-soluble organic solvent. The water-soluble organic solvent is not particularly limited, and examples thereof include alkyl polyols, pyrrolidone derivatives, glycol ethers, and the like. These organic solvents may be used alone as one type, or two or more types may be used in combination. Note that since the specific examples, effects, content ranges and the like of each of the organic solvents are the same as those described for the first ink composition, and description thereof will be omitted.

In the same manner as the first ink composition, the clear ink composition preferably substantially does not contain a water-soluble organic solvent having a normal boiling point of 280° C. or higher. In addition, even in a case where the water-soluble organic solvent included in the clear ink composition is used as one type alone or in a combination of two or more types, all the solvents are preferably water-soluble organic solvents having a normal boiling point of 250° C. or less. Not including a water-soluble organic solvent having a normal boiling point exceeding 250° C. makes it possible to maintain the drying property of the ink to be high.

7.1.4. Water

The clear ink composition contains water. Water is the main medium of the clear ink composition and is a component which is evaporated and scattered by drying. Since the water is the same as that of the first ink composition, description thereof will be omitted.

It is also possible for the clear ink composition to be preferably be used as the water-based ink described above.

7.1.5. Other Components

The clear ink composition may contain a wax, a surfactant, a pH adjuster, an antiseptic/fungicide, a chelating agent, a rust inhibitor, and the like. Since the specific examples of the components, effects of each agent, content ranges and the like are the same as the contents described for the first ink composition, description thereof will be omitted.

7.1.6. Solid Content

As in the first ink composition described above, the solid content in the clear ink composition represents components which do not evaporate and volatilize in the third drying step described below, that is, components other than volatile components such as water, a water-soluble organic solvent, or the like, such as the resin particles, chelating agent, rust inhibitor, and the like present in the ink composition.

7.1.7. Water-Soluble Organic Solvent Content/Solid Content r3

As described above, the clear ink composition includes a water-soluble organic solvent and resin particles or the like as solid content. Therefore, it is possible to define "r3" as "water-soluble organic solvent content/solid content". It is preferable that "r3" have a specific relationship to be described below with "r1" of the first ink composition described above.

7.1.8. Value of "r3/r1"

In a case where a step of forming a third ink layer in the ink jet recording method of the present embodiment is performed, in a case where "water-soluble organic solvent content/solid content" of the first ink composition is "r1" and "water-soluble organic solvent content/solid content" of the clear ink composition" is "r3", a value of "r3/r1" is preferably 2 or less. By doing so, the composition balance of the first ink composition and the clear ink composition is favorable. That is, since the value of "r3/r1" is 2 or less, the distribution and remaining amount of the solvent in the laminated structure of the lower layer image (for example, the first ink layer) and the uppermost layer (for example, the third ink layer) are favorable and when finally drying the formed image (for example, in the second drying step), the shrinkage rate of the lower layer image (for example, the first ink layer) and the shrinkage rate of the image of the uppermost layer (for example, the second ink layer) do not differ greatly. Due to this, cracks in the obtained image are suppressed.

Such an effect is obtained in a case where the value of "r3/r1" is 2 or less, but the value of "r3/r1" is preferably 1.8 or less, and more preferably 1.5 or less. In addition, the lower limit value of the value of "r3/r1" is 0.5 or more, more preferably 0.7 or more, and even more preferably 1 or more.

7.2. Third Drying Step

In the case where the ink jet recording method of the present embodiment includes a step of forming a third ink layer, a third drying step may further be included. In the third drying step, the volatile components (water, alkyl polyol, glycol ether, and the like) included in the first ink layer, the second ink layer and the third ink layer are evaporated.

The method used in the third drying step and the means used are the same as in the post-drying step described in the second drying step. That is, in the third drying step, volatile components (water, alkylpolyol, glycol ether, and the like) included in the first ink layer, the second ink layer, and the third ink layer are evaporated and dried to a state in which the recorded material is usable.

In the drying performed in the third drying step, since at least the first ink layer and the second ink layer are dried to a predetermined moisture amount through the second drying step (the first drying step 2), it is possible to suppress the flow of ink droplets forming the first ink layer, the second ink layer, and the third ink layer. Due to this, since it is possible to retain the ink droplets of the third ink composition at the positions where the ink droplets are attached, it is possible to suppress bleeding of the image caused by excessively mixing the components included in each layer.

8. Ink Jet Method

It is possible to perform the ink jet recording method according to the present embodiment using an ink jet recording apparatus having a recording head. Description will be given of the ink jet recording apparatus used in the ink jet recording method according to the present embodiment.

It is possible to use either a serial type or a line type ink jet recording apparatus. In these types of ink jet recording apparatuses, a recording head is mounted, and liquid droplets of the ink composition are ejected from the nozzle holes of the recording head at a predetermined timing and at a predetermined volume (mass) while changing the relative positional relationship between the recording medium and the recording head, and it is possible to form a predetermined image by attaching a first ink composition to the recording medium.

For the ink jet recording apparatus used in the present embodiment, it is possible to employ a well-known configuration such as, for example, a drying unit, a roll unit, and a winding apparatus without limitation. In addition, the ink jet recording apparatus is able to have transport means which transports a recording medium, ink layer forming means which records an image (ink layer) by using an ink composition, ink layer drying means, whole-body drying means for heating and air-blowing the recording surface, and the like.

It is possible to form the transport means of, for example, a roller. The transport means may have a plurality of rollers. As long as the transport means is able to transport the recording medium, the position and number of the transport means to be provided are optional. The transport means may include a paper feed roll, a paper feed tray, a paper discharge roll, a paper discharge tray, various platens, and the like.

The ink layer forming means ejects the first ink composition, the second ink composition, and the clear ink composition of the present embodiment as necessary onto the recording surface of the recording medium to record the first to third ink layers. The ink layer forming means is provided with a recording head provided with nozzles, and the recording heads may be different for each ink, or a nozzle array may be assigned for each ink.

It is possible for the ink layer drying means to perform at least one of the first to third drying steps. The ink layer drying means is used for drying the ink layer formed on the recording surface or for removing volatile components on the recording medium. The ink layer drying means may be provided at any position in consideration of the timing at which the first to third drying steps are performed, the transport path of the recording medium, and the like, and any number thereof may be provided. Examples of the ink layer drying means include a method of applying heat to the recording medium by heating the platen or the like, a method of blowing air onto the image on the recording medium, a method of combining theses, and the like. Specifically, the means used in these methods may be forced air heating, radiation heating, conductive heating, high frequency drying, microwave drying, or the like.

9. Method for Preparing Ink

The first ink composition, the second ink composition, and the clear ink composition described above are obtained by mixing the components described above in an optional order and removing impurities by filtering or the like as necessary. As a method of mixing the respective components, a method in which materials are sequentially added to a container provided with a stirring device such as a mechanical stirrer, a magnetic stirrer, and the like, and then stirred and mixed is suitably used. As a filtration method, it is possible to perform centrifugal filtration, filter filtration and the like as necessary.

10. Physical Properties of Ink

From the viewpoint of the balance between the image quality and the reliability as an ink jet ink, the first ink composition, the second ink composition, and the clear ink composition described above preferably have a surface tension at 20° C. of 15 mN/m or more and 50 mN/m, and more preferably 20 mN/m or more and 40 mN/m or less. Note that, it is possible to measure the surface tension, for example, by confirming the surface tension when a platinum plate is wetted with an ink composition under an environment of 20° C. using an automatic surface tensiometer CBVP-Z (trade name, manufactured by Kyowa Interface Science Co., Ltd.).

In addition, from the same viewpoint, the viscosity of each of the ink compositions described above at 20° C. is preferably 2 mPa·s or more and 15 mPa·s or less, and more preferably 2 mPa·s or more and 10 mPa·s or less. Note that, it is possible to measure the viscosity under an environment of 20° C. using, for example, a viscoelasticity tester MCR-300 (trade name, manufactured by Pysica).

11. Examples and Comparative Examples

More specific description will be given below of the embodiments of the present invention using Examples, but the present embodiment is not limited to these Examples.

11.1. Preparation of First Ink Composition, Second Ink Composition, and Clear Ink Composition With the material compositions shown in Table 1, first ink compositions 1-(1) to 1-(4), second ink compositions 2-(1) to 2-(5), and clear ink compositions 3-(1) to 1-(5), which differ in material composition from each other, were obtained. Each ink composition was prepared by placing the materials shown in Table 1 in a container, stirring and mixing with a magnetic stirrer for 2 hours and then filtering with a membrane filter having a pore size of 5 μm to remove impurities such as dust and coarse particles. Note that, the values in Table 1 all indicate % by mass, and ion exchanged water was added such that the total mass of the clear ink composition was 100% by mass. Note that, the pigment dispersion was prepared in advance as follows. In addition, the numerals in parentheses in the table indicate the solid content in the pigment dispersion and the solid content of the resin particles supplied in the emulsion form. Each ink composition was attached to the recording medium used for creating recorded material to be described below at an attachment amount of 10 mg/inch$^2$, dried in the post-drying step of Example 1, and then the solid content of the ink composition was determined from mass spectrometry, and r1, r2, and r3 shown in Table 1 are values calculated from the results thereof and the content of the water-soluble organic solvent of the ink composition. Note that, the resin dispersant included in the cyan pigment dispersion also includes a low molecular weight dispersant in practice, and there is a possibility that this may not remain as a solid content.

Note that, the values of r1, r2, and r3 in Table 1 are values obtained by rounding off the second digit after the decimal point of r1, r2, and r3. On the other hand, the values of r2/r1 and r3/r1 in Tables 2 to 6 are values obtained by calculating r2/r1 and r3/r1 from values having up to the second digit after the decimal point obtained by rounding off the third digit after the decimal point using the values of r1, r2, and r3 that have the third digit after the decimal point, and rounding off the second digit after the decimal point.

Preparation of Pigment Dispersion

In the first ink composition (white ink composition) used in Examples and Comparative Examples, a water-insoluble pigment (white coloring material) was used as a colorant. In addition, a water-insoluble color pigment (cyan pigment) colorant was used as the second ink composition used in Examples and Comparative Examples. When a pigment is added to each ink composition, a resin-dispersed pigment in which the pigment is dispersed in advance with a resin dispersant is used. Specifically, a pigment dispersion was prepared as follows.

Preparation of White Coloring Material Dispersion

First, 4 parts by mass of an acrylic acid-acrylic acid ester copolymer (weight average molecular weight: 25,000, acid value: 180) as a resin dispersant were added and dissolved in 155 parts by mass of ion exchanged water in which 1 part by mass of a 30% ammonia aqueous solution (neutralizing agent) was dissolved. Then, 40 parts by mass of titanium oxide (C.I. Pigment White 6) which is a white pigment were added thereto and a dispersing treatment was performed for 10 hours by a ball mill with zirconia beads. Thereafter, centrifugal filtration with a centrifugal separator was performed to remove impurities such as coarse particles and dust, and the concentration of the white pigment was adjusted to 20% by mass and a white coloring material dispersion was obtained. The particle diameter of the white pigment was 350 nm as an average particle diameter.

Preparation of Cyan Pigment Dispersion

First, 7.5 parts by mass of an acrylic acid-acrylic acid ester copolymer (weight average molecular weight: 25,000, acid value: 180) as a resin dispersant were added and dissolved in 160.5 parts by mass of ion exchanged water in which 2 parts by mass of a 30% ammonia aqueous solution (neutralizing agent) were dissolved. Then, as a cyan pigment, 30 parts by mass of C.I. Pigment Blue 15:3 were added and a dispersing treatment was carried out for 10 hours in a ball mill with zirconia beads. Thereafter, centrifugal filtration with a centrifugal separator was performed to remove impurities such as coarse particles and dust, and the cyan pigment concentration was adjusted to 15% by mass to obtain a cyan pigment dispersion. The particle diameter of the cyan pigment at that time was 100 nm as an average particle diameter.

Other than the compound names, the materials described in Table 1 are as follows.

JONCRYL 1992 (trade name, manufactured by BASF SE, styrene-acrylic acid copolymer emulsion, Tg: 78° C., 43% dispersion)

Takelac W-6061 (trade name, manufactured by Mitsui Chemicals, Inc., polyurethane resin emulsion, Tg: 25° C., 30% dispersion)

Ester-based resin particle emulsion A

The ester-based resin particle emulsion A was created as follows. As raw material monomers for the polyester resin, a polyoxypropylene (2.2) adduct of bisphenol A, a polyoxyethylene (2.0) adduct of bisphenol A, hydrogenated bisphenol A, isophthalic acid, fumaric acid, and dibutyltin oxide were mixed and polymerized to obtain a polyester resin.

10 g of the polyester resin with an anionic surfactant (trade name: "Neoperex G-15" manufactured by Kao Corp.) as solid content was mixed with 200 g of methyl ethyl ketone, and dissolved at 25° C. Thereafter, 600 g of ion-exchanged water and 3.0 g of 25% ammonia water were mixed in a 2000 mL stainless steel beaker made of SUS 304 and a dispersion treatment was carried out at 30° C. using an ultrasonic homogenizer (product name: UP-400S, manufactured by DKSH Management Ltd.). Thereafter, the temperature was raised to 50° C., and the methyl ethyl ketone was distilled off under reduced pressure. Thereafter, the solid content was adjusted to 30% by mass with ion-exchanged water to obtain the ester-based resin particle emulsion A (Tg: 60° C.), which was used.

Mowinyl 972 (trade name, manufactured by Nippon Synthetic Chemical Industry Co., Ltd., Tg 101° C., 50% dispersion)

AQUACER 515 (trade name, manufactured by BYK Japan K.K., polyethylene wax emulsion, melting point 135° C., 35% dispersion)

Nopcoat PEM-17 (trade name, manufactured by San Nopco Ltd., polyethylene wax emulsion, melting point 103° C., 40% dispersion)

BYK-348 (trade name, manufactured by BYK Japan K.K., silicone surfactant)

Surfynol DF-110D (trade name, manufactured by Air Products and Chemicals, Inc., acetylene glycol-based surfactant)

TABLE 1

| Material | First ink composition 1-(1) | 1-(2) | 1-(3) | 1-(4) | Second ink composition 2-(1) | 2-(2) | 2-(3) |
|---|---|---|---|---|---|---|---|
| White coloring material dispersion (Titanium dioxide content: 20% by mass) (Resin dispersant content: 2% by mass) | 50 (11) | 50 (11) | 50 (11) | 60 (13.2) | — | — | — |
| Cyan pigment dispersant (Cyan pigment content: 15% by mass) (Resin dispersant content: 3.75% by mass) | — | — | — | — | 26.67 (5) | 26.67 (5) | 26.67 (5) |
| JONCRYL 1992 (Styrene-acrylic acid copolymer emulsion) Tg: 78° C. <43% dispersion> | 9.31 (4.0) | — | — | — | 4.66 (2.0) | — | — |
| Takelac W-6061 (Polyurethane resin emulsion) Tg: 25° C. <30% dispersion> | — | 13.33 (4) | — | — | — | — | — |
| Ester-based resin particle emulsion A Tg: 60° C. <30% dispersion> | — | — | 13.33 (4.0) | 15.5 (4.65) | — | 6.67 (2.0) | 5 (1.5) |
| Mowinyl 972 (Styrene-acrylic acid copolymer emulsion) Tg: 101° C. <50% dispersion> | — | — | — | — | — | — | — |
| AQUACER 515 (Polyethylene wax emulsion) Melting point: 135° C. <35% dispersion> | — | — | — | — | 2.86 (1) | 2.86 (1) | 2.15 (0.75) |
| Nopcoat PEM-17 (Polyethylene wax emulsion) Melting point: 103° C. <40% dispersion> | 2.5 (1) | 2.5 (1) | 2.5 (1) | 2.5 (1) | — | — | — |
| 1,2-hexanediol (water-soluble organic solvent) boiling point: 224° C. | 3 | 3 | 3 | 5 | 5 | 5 | 5 |
| Propylene glycol (water-soluble organic solvent) boiling point: 189° C. | 5 | 5 | 5 | 6 | 15 | 15 | 15 |
| 1,3-butylene glycol (water-soluble organic solvent) boiling point: 208° C. | 5 | 5 | 5 | 6 | — | — | — |
| 3-methyl-1,5-pentanediol (water-soluble organic solvent) boiling point: 250° C. | — | — | — | — | — | — | — |
| 2-pyrrolidone (water-soluble organic solvent) boiling point: 245° C. | 15 | 15 | 15 | 16 | 5 | 5 | 5 |
| BYK-348 (Silicone-based surfactant) | 0.5 | 0.5 | 0.5 | 0.5 | 0.5 | 0.5 | 0.5 |
| Surfynol DF110D (Acetylene glycol-based surfactant) | 0.3 | 0.3 | 0.3 | 0.3 | 0.3 | 0.3 | 0.3 |
| Triethanol amine (pH adjuster) | 0.1 | 0.1 | 0.1 | 0.1 | 0.1 | 0.1 | 0.1 |
| Ethylenediamine tetraacetate (chelating agent) | 0.05 | 0.05 | 0.05 | 0.05 | 0.05 | 0.05 | 0.05 |
| Benzotriazole (rust inhibitor) | 0.02 | 0.02 | 0.02 | 0.02 | 0.02 | 0.02 | 0.02 |
| Ion-exchanged water | Remainder | Remainder | Remainder | Remainder | Remainder | Remainder | Remainder |
| Total (% by mass) | 100 | 100 | 100 | 100 | 100 | 100 | 100 |
| Water-soluble organic solvent content/solid content (r1, r2, r3) | 1.8 | 1.8 | 1.8 | 1.8 | 3.2 | 3.2 | 3.5 |

| Material | Second ink composition 2-(4) | 2-(5) | Clear ink composition 3-(1) | 3-(2) | 3-(3) | 3-(4) | 3-(5) |
|---|---|---|---|---|---|---|---|
| White coloring material dispersion (Titanium dioxide content: 20% by mass) (Resin dispersant content: 2% by mass) | — | — | — | — | — | — | — |
| Cyan pigment dispersant (Cyan pigment content: 15% by mass) (Resin dispersant content: 3.75% by mass) | 26.67 (5) | 26.67 (5) | — | — | — | — | — |
| JONCRYL 1992 (Styrene-acrylic acid copolymer emulsion) Tg: 78° C. <43% dispersion> | 4.66 (2.0) | 2.33 (1.0) | — | — | — | — | — |
| Takelac W-6061 (Polyurethane resin emulsion) Tg: 25° C. <30% dispersion> | — | — | — | — | — | — | — |
| Ester-based resin particle emulsion A Tg: 60° C. <30% dispersion> | — | — | — | 25 (7.5) | 25 (7.5) | — | — |
| Mowinyl 972 (Styrene-acrylic acid copolymer emulsion) Tg: 101° C. <50% dispersion> | — | — | 15 (7.5) | — | — | 12 (6.0) | 10 (5.0) |
| AQUACER 515 (Polyethylene wax emulsion) Melting point: 135° C. <35% dispersion> | 2.86 (1) | 1.43 (0.5) | 8.57 (3) | 8.57 (3) | 8.57 (3) | 6.86 (2.4) | 5.72 (2.0) |
| Nopcoat PEM-17 (Polyethylene wax emulsion) Melting point: 103° C. <40% dispersion> | — | — | — | — | — | — | — |
| 1,2-hexanediol (water-soluble organic solvent) boiling point: 224° C. | 5 | 5 | 5 | 5 | 5 | 5 | 5 |
| Propylene glycol (water-soluble organic solvent) boiling point: 189° C. | 20 | 20 | — | — | — | — | — |
| 1,3-butylene glycol (water-soluble organic solvent) boiling point: 208° C. | — | — | — | — | — | — | — |
| 3-methyl-1,5-pentanediol (water-soluble organic solvent) boiling point: 250° C. | — | — | 10 | 10 | 10 | 10 | 10 |
| 2-pyrrolidone (water-soluble organic solvent) boiling point: 245° C. | 5 | 5 | 15 | 15 | 20 | 15 | 15 |
| BYK-348 (Silicone-based surfactant) | 0.5 | 0.5 | 0.5 | 0.5 | 0.5 | 0.5 | 0.5 |
| Surfynol DF110D (Acetylene glycol-based surfactant) | 0.3 | 0.3 | 0.3 | 0.3 | 0.3 | 0.3 | 0.3 |

TABLE 1-continued

| | | | | | | | |
|---|---|---|---|---|---|---|---|
| Triethanol amine (pH adjuster) | 0.1 | 0.1 | 0.1 | 0.1 | 0.1 | 0.1 | 0.1 |
| Ethylenediamine tetraacetate (chelating agent) | 0.05 | 0.05 | 0.05 | 0.05 | 0.05 | 0.05 | 0.05 |
| Benzotriazole (rust inhibitor) | 0.02 | 0.02 | 0.02 | 0.02 | 0.02 | 0.02 | 0.02 |
| Ion-exchanged water | Remainder | Remainder | Remainder | Remainder | Remainder | Remainder | Remainder |
| Total (% by mass) | 100 | 100 | 100 | 100 | 100 | 100 | 100 |
| Water-soluble organic solvent content/solid content (r1, r2, r3) | 3.8 | 4.7 | 2.9 | 2.9 | 3.4 | 3.6 | 4.4 |

11.2. Creation of Recorded Material

Recorded materials used for each evaluation were produced in the following manner.

A recording medium (soft packaging film: biaxially stretched OPP <polypropylene film>, manufactured by Futamura Chemical Co., Ltd., trade name: FOS-BT, film thickness: 60 μm) was set on a modified machine of an ink jet printer SC-S30650 (trade name, manufactured by Seiko Epson Corp.), and the recording head was filled with the first ink composition, the second ink composition, and the clear ink composition. As a drying mechanism, a blowing mechanism, a heat conduction mechanism, and a radiant heating mechanism (specifically, a blower fan, a rear surface platen heater, an infrared irradiation apparatus, respectively) were attached to the printer.

The first ink layer was ink jet coated on a recording medium at a resolution of 720×720 dpi and an attachment amount of 10.0 mg/inch$^2$ with the ink compositions (refer to Table 1) described in Tables 2 to 6 to form a pattern. The first ink layer was heated and dried under the drying conditions described in Tables 2 to 6 during and after ejection. Note that, in Example 10, the second ink composition (color ink composition) was used for the first ink layer and the first ink composition (white ink composition) was used for the second ink layer.

At the time when the water evaporation rate (moisture drying rate) of the first ink layer was the value in the table in the first drying step, the second ink layer was formed so as to be smaller than and overlapped in the pattern of the first ink layer. The moisture evaporation rate was analyzed by thermal mass spectrometry (TGA: manufactured by TA Instruments, trade name: Q500) of the ink layer on the recording medium in the first drying step. Further, analysis (trade name: Xevo G2-SQTof, manufactured by Waters) of a sample of the ink layer collected from the recording medium by liquid chromatography was also performed. In this manner, the water and water-soluble organic solvent contained in the ink composition used for recording were quantified, and from the comparison with the initial ink composition, the evaporation amount of water and the water-soluble organic solvent was calculated. Note that, the evaporation rate (drying rate) of the water-soluble organic solvent in the first ink layer at this time point was approximately 0% by mass in a case where the water evaporation rate was 90% by mass or less, and approximately 3% by mass in a case where the water evaporation rate was 90% by mass or more. In Comparative Example 11, by setting the temperature of the first drying step to 70° C., 30% by mass of the water-soluble organic solvent was evaporated.

The recording resolution and the attachment amount of the second ink layer were the same as those of the first ink layer. After the attachment, the first drying step 2 (corresponding to one aspect of the second drying step of the embodiment described above) was performed for all the Examples and Comparative Examples under the same heating and drying conditions as in the first drying step of Example 3.

The evaporation rate of the total moisture of the first ink layer and the second ink layer in the pattern formed of the laminate of the first ink layer and the second ink layer dried in this manner was 95% by mass when measured.

In addition, in the example of forming the third ink layer, the coating of the clear ink compositions (refer to Table 1) described in Table 3 to Table 6 was performed at the time point when the total evaporation rate of the water-soluble organic solvent of the first ink layer and the second ink layer was 3% by mass. The coating amount was set to a resolution of 720×720 dpi and an attachment amount of 7.0 mg/inch$^2$. Then, under the same heating conditions as in the first drying step of Example 3, the first drying step 2 (corresponding to one aspect of the second drying step of the embodiment described above) was performed.

In the example in which the third ink layer was not formed, after the first drying step and the second drying step (first drying step 2) were performed as described above, the recording medium was discharged from the printer.

In the example in which the third ink layer was formed, the recording medium was discharged from the printer after performing the first drying step and the second drying step (first drying step 2) twice as described above.

Then, in the example in which the third ink layer was not formed, the second drying step (post-drying step corresponding to one aspect of the second drying step of the embodiment described above) was performed and in the example in which the third ink layer was formed, the third drying step (post-drying step) was performed under the conditions in the table.

Note that, the surface temperature of the recording medium in the table was measured with a non-contact type thermometer. In a case of using a plurality of mechanisms, the temperature was measured for each place being heated by each mechanism and listed in the respective tables.

Regarding the air blowing conditions in the first drying step in the table, an air stream with a temperature of 40° C. with respect to the recorded material during recording was adjusted such that the air speed on the recording surface of the recording medium was 0.5 m/s or 1 m/s, and air blowing was carried out. In addition, in Example 2, the heater setting of the printer paper guide portion (platen) at the time of recording was set to "set the surface temperature of the recording surface to be 40° C.". Further, for the infrared irradiation, the setting of the irradiation apparatus was set as "set the surface temperature of the recording surface to be 50° C. or 70° C.".

For the air blowing conditions in the second drying step (post-drying step) and the third drying step in the table, an air stream with a temperature of 90° C. with respect to the recorded material in the recording was adjusted such that the air speed on the recording surface of the recording medium was approximately 20 m/s, and air blowing was carried out. In addition, for the infrared irradiation, the setting of the irradiation apparatus was set to "set the surface temperature of the recording surface to be 80° C.".

TABLE 2

| | | | Examples | | | | | | | | | |
|---|---|---|---|---|---|---|---|---|---|---|---|---|
| | | | 1 | 2 | 3 | 4 | 5 | 6 | 7 | 8 | 9 | 10 |
| | | First ink layer | 1-(1) | 1-(1) | 1-(1) | 1-(2) | 1-(2) | 1-(2) | 1-(3) | 1-(3) | 1-(3) | 2-(2) |
| | | Second ink layer | 2-(1) | 2-(1) | 2-(1) | 2-(1) | 2-(2) | 2-(3) | 2-(1) | 2-(2) | 2-(3) | 1-(2) |
| | | Third ink layer | — | — | — | — | — | — | — | — | — | — |
| | | r2/r1 | 1.8 | 1.8 | 1.8 | 1.8 | 1.8 | 2.0 | 1.8 | 1.8 | 2.0 | 0.6 |
| | | r3/r1 | — | — | — | — | — | — | — | — | — | — |
| First drying step | Air blowing | Surface air speed of recording medium (m/s) | 1 | 0.5 | 0.5 | 0.5 | 0.5 | 0.5 | 0.5 | 0.5 | 0.5 | 0.5 |
| | | Air temperature (° C.) | 40 | 40 | 40 | 40 | 40 | 40 | 40 | 40 | 40 | 40 |
| | Conductive heating | Rear surface platen (surface temperature of recording medium: ° C.) | — | 40 | — | — | — | — | — | — | — | — |
| | Radiation | Infrared radiation (surface temperature of recording medium: ° C.) | — | — | 50 | 50 | 50 | 50 | 50 | 50 | 50 | 50 |
| | | Water evaporation rate (%) in first ink layer | 80 | 90 | 95 | 95 | 95 | 95 | 95 | 95 | 95 | 95 |
| Second drying step (First drying step 2) | Air blowing | Surface air speed of recording medium (m/s) | 0.5 | 0.5 | 0.5 | 0.5 | 0.5 | 0.5 | 0.5 | 0.5 | 0.5 | 0.5 |
| | | Air temperature (° C.) | 40 | 40 | 40 | 40 | 40 | 40 | 40 | 40 | 40 | 40 |
| | Conductive heating | Rear surface platen (surface temperature of recording medium: ° C.) | — | — | — | — | — | — | — | — | — | — |
| | Radiation | Infrared radiation (surface temperature of recording medium: ° C.) | 50 | 50 | 50 | 50 | 50 | 50 | 50 | 50 | 50 | 50 |
| | | Water evaporation rate (%) in first ink layer and second ink layer | 95 | 95 | 95 | 95 | 95 | 95 | 95 | 95 | 95 | 95 |
| Second drying step (Post-drying step) | Air blowing | Surface air speed of recording medium (m/s) | 20 | 20 | 20 | 20 | 20 | 20 | 20 | 20 | 20 | 20 |
| | | Air temperature (° C.) | 90 | 90 | 90 | 90 | 90 | 90 | 90 | 90 | 90 | 90 |
| | Radiation | Infrared radiation (surface temperature of recording medium: ° C.) | 80 | 80 | 80 | 80 | 80 | 80 | 80 | 80 | 80 | 80 |
| Third drying step (Post-drying step) | Air blowing | Surface air speed of recording medium (m/s) | — | — | — | — | — | — | — | — | — | — |
| | | Air temperature (° C.) | — | — | — | — | — | — | — | — | — | — |
| | Radiation | Infrared radiation (surface temperature of recording medium: ° C.) | — | — | — | — | — | — | — | — | — | — |
| Image quality | | Bleeding | B | A | A | A | A | A | A | A | A | A |
| | | Cracks | B | A | A | A | A | B | A | A | B | B |
| Durability | | Adhesion (tape peeling) | D | D | D | A | A | A | A | A | A | A |
| | | Abrasion resistance | C | C | C | B | B | B | B | B | B | C |

TABLE 3

| | | | Examples | | | | | | | | | |
|---|---|---|---|---|---|---|---|---|---|---|---|---|
| | | | 11 | 12 | 13 | 14 | 15 | 16 | 17 | 18 | 19 | 20 |
| | | First ink layer | 1-(1) | 1-(2) | 1-(3) | 1-(1) | 1-(2) | 1-(3) | 1-(1) | 1-(2) | 1-(3) | 1-(1) |
| | | Second ink layer | 2-(1) | 2-(1) | 2-(1) | 2-(2) | 2-(2) | 2-(2) | 2-(3) | 2-(3) | 2-(3) | 2-(1) |
| | | Third ink layer | 3-(1) | 3-(1) | 3-(1) | 3-(1) | 3-(1) | 3-(1) | 3-(1) | 3-(1) | 3-(1) | 3-(2) |
| | | r2/r1 | 1.8 | 1.8 | 1.8 | 1.8 | 1.8 | 1.8 | 2.0 | 2.0 | 2.0 | 1.8 |
| | | r3/r1 | 1.6 | 1.6 | 1.6 | 1.6 | 1.6 | 1.6 | 1.6 | 1.6 | 1.6 | 1.6 |
| First drying step | Air blowing | Surface air speed of recording medium (m/s) | 0.5 | 0.5 | 0.5 | 0.5 | 0.5 | 0.5 | 0.5 | 0.5 | 0.5 | 0.5 |
| | | Air temperature (° C.) | 40 | 40 | 40 | 40 | 40 | 40 | 40 | 40 | 40 | 40 |
| | Conductive heating | Rear surface platen (surface temperature of recording medium: ° C.) | — | — | — | — | — | — | — | — | — | — |
| | Radiation | Infrared radiation (surface temperature of recording medium: ° C.) | 50 | 50 | 50 | 50 | 50 | 50 | 50 | 50 | 50 | 50 |
| | | Water evaporation rate (%) in first ink layer | 95 | 95 | 95 | 95 | 95 | 95 | 95 | 95 | 95 | 95 |
| Second drying step (First drying step 2) | Air blowing | Surface air speed of recording medium (m/s) | 0.5 | 0.5 | 0.5 | 0.5 | 0.5 | 0.5 | 0.5 | 0.5 | 0.5 | 0.5 |
| | | Air temperature (° C.) | 40 | 40 | 40 | 40 | 40 | 40 | 40 | 40 | 40 | 40 |
| | Conductive heating | Rear surface platen (surface temperature of recording medium: ° C.) | — | — | — | — | — | — | — | — | — | — |

TABLE 3-continued

| | | | Examples | | | | | | | | | |
|---|---|---|---|---|---|---|---|---|---|---|---|---|
| | | | 11 | 12 | 13 | 14 | 15 | 16 | 17 | 18 | 19 | 20 |
| | Radiation | Infrared radiation (surface temperature of recording medium: ° C.) | 50 | 50 | 50 | 50 | 50 | 50 | 50 | 50 | 50 | 50 |
| | Water evaporation rate (%) in first ink layer and second ink layer | | 95 | 95 | 95 | 95 | 95 | 95 | 95 | 95 | 95 | 95 |
| Second drying step (Post-drying step) | Air blowing | Surface air speed of recording medium (m/s) | — | — | — | — | — | — | — | — | — | — |
| | | Air temperature (° C.) | — | — | — | — | — | — | — | — | — | — |
| | Radiation | Infrared radiation (surface temperature of recording medium: ° C.) | — | — | — | — | — | — | — | — | — | — |
| Third drying step (Post-drying step) | Air blowing | Surface air speed of recording medium (m/s) | 20 | 20 | 20 | 20 | 20 | 20 | 20 | 20 | 20 | 20 |
| | | Air temperature (° C.) | 90 | 90 | 90 | 90 | 90 | 90 | 90 | 90 | 90 | 90 |
| | Radiation | Infrared radiation (surface temperature of recording medium: ° C.) | 80 | 80 | 80 | 80 | 80 | 80 | 80 | 80 | 80 | 80 |
| Image quality | Bleeding | | A | A | A | A | A | A | A | A | A | A |
| | Cracks | | B | A | A | A | A | A | B | B | B | B |
| Durability | Adhesion (tape peeling) | | D | B | B | D | A | B | D | A | A | D |
| | Abrasion resistance | | B | A | A | B | A | A | B | A | A | B |

TABLE 4

| | | | Examples | | | | | | | | | |
|---|---|---|---|---|---|---|---|---|---|---|---|---|
| | | | 21 | 22 | 23 | 24 | 25 | 26 | 27 | 28 | 29 | 30 |
| | First ink layer | | 1-(2) | 1-(3) | 1-(1) | 1-(2) | 1-(3) | 1-(1) | 1-(2) | 1-(3) | 1-(1) | 1-(2) |
| | Second ink layer | | 2-(1) | 2-(1) | 2-(2) | 2-(2) | 2-(2) | 2-(3) | 2-(3) | 2-(3) | 2-(1) | 2-(1) |
| | Third ink layer | | 3-(2) | 3-(2) | 3-(2) | 3-(2) | 3-(2) | 3-(2) | 3-(2) | 3-(2) | 3-(3) | 3-(3) |
| | r2/r1 | | 1.8 | 1.8 | 1.8 | 1.8 | 1.8 | 2.0 | 2.0 | 2.0 | 1.8 | 1.8 |
| | r3/r1 | | 1.6 | 1.6 | 1.6 | 1.6 | 1.6 | 1.6 | 1.6 | 1.6 | 1.9 | 1.9 |
| First drying step | Air blowing | Surface air speed of recording medium (m/s) | 0.5 | 0.5 | 0.5 | 0.5 | 0.5 | 0.5 | 0.5 | 0.5 | 0.5 | 0.5 |
| | | Air temperature (° C.) | 40 | 40 | 40 | 40 | 40 | 40 | 40 | 40 | 40 | 40 |
| | Conductive heating | Rear surface platen (surface temperature of recording medium: ° C.) | — | — | — | — | — | — | — | — | — | — |
| | Radiation | Infrared radiation (surface temperature of recording medium: ° C.) | 50 | 50 | 50 | 50 | 50 | 50 | 50 | 50 | 50 | 50 |
| | Water evaporation rate (%) in first ink layer | | 95 | 95 | 95 | 95 | 95 | 95 | 95 | 95 | 95 | 95 |
| Second drying step (First drying step 2) | Air blowing | Surface air speed of recording medium (m/s) | 0.5 | 0.5 | 0.5 | 0.5 | 0.5 | 0.5 | 0.5 | 0.5 | 0.5 | 0.5 |
| | | Air temperature (° C.) | 40 | 40 | 40 | 40 | 40 | 40 | 40 | 40 | 40 | 40 |
| | Conductive heating | Rear surface platen (surface temperature of recording medium: ° C.) | — | — | — | — | — | — | — | — | — | — |
| | Radiation | Infrared radiation (surface temperature of recording medium: ° C.) | 50 | 50 | 50 | 50 | 50 | 50 | 50 | 50 | 50 | 50 |
| | Water evaporation rate (%) in first ink layer and second ink layer | | 95 | 95 | 95 | 95 | 95 | 95 | 95 | 95 | 95 | 95 |
| Second drying step (Post-drying step) | Air blowing | Surface air speed of recording medium (m/s) | — | — | — | — | — | — | — | — | — | — |
| | | Air temperature (° C.) | — | — | — | — | — | — | — | — | — | — |
| | Radiation | Infrared radiation (surface temperature of recording medium: ° C.) | — | — | — | — | — | — | — | — | — | — |
| Third drying step (Post-drying step) | Air blowing | Surface air speed of recording medium (m/s) | 20 | 20 | 20 | 20 | 20 | 20 | 20 | 20 | 20 | 20 |
| | | Air temperature (° C.) | 90 | 90 | 90 | 90 | 90 | 90 | 90 | 90 | 90 | 90 |
| | Radiation | Infrared radiation (surface temperature of recording medium: ° C.) | 80 | 80 | 80 | 80 | 80 | 80 | 80 | 80 | 80 | 80 |
| Image quality | Bleeding | | A | A | A | A | A | A | A | A | A | A |
| | Cracks | | A | A | A | A | A | B | B | B | B | B |
| Durability | Adhesion (tape peeling) | | B | B | D | A | B | D | A | B | D | B |
| | Abrasion resistance | | A | A | B | A | A | B | A | A | B | A |

TABLE 5

| | | | Examples | | | | | | | |
|---|---|---|---|---|---|---|---|---|---|---|
| | | | 31 | 32 | 33 | 34 | 35 | 36 | 37 | 38 |
| | | First ink layer | 1-(3) | 1-(1) | 1-(2) | 1-(3) | 1-(1) | 1-(2) | 1-(3) | 1-(4) |
| | | Second ink layer | 2-(1) | 2-(2) | 2-(2) | 2-(2) | 2-(3) | 2-(3) | 2-(3) | 2-(1) |
| | | Third ink layer | 3-(3) | 3-(3) | 3-(3) | 3-(3) | 3-(3) | 3-(3) | 3-(3) | — |
| | | r2/r1 | 1.8 | 1.8 | 1.8 | 1.8 | 2.0 | 2.0 | 2.0 | 1.8 |
| | | r3/r1 | 1.9 | 1.9 | 1.9 | 1.9 | 1.9 | 1.9 | 1.9 | — |
| First drying step | Air blowing | Surface air speed of recording medium (m/s) | 0.5 | 0.5 | 0.5 | 0.5 | 0.5 | 0.5 | 0.5 | 0.5 |
| | | Air temperature (° C.) | 40 | 40 | 40 | 40 | 40 | 40 | 40 | 40 |
| | Conductive heating | Rear surface platen (surface temperature of recording medium: ° C.) | — | — | — | — | — | — | — | — |
| | Radiation | Infrared radiation (surface temperature of recording medium: ° C.) | 50 | 50 | 50 | 50 | 50 | 50 | 50 | 50 |
| | | Water evaporation rate (%) in first ink layer | 95 | 95 | 95 | 95 | 95 | 95 | 95 | 95 |
| Second drying step (First drying step 2) | Air blowing | Surface air speed of recording medium (m/s) | 0.5 | 0.5 | 0.5 | 0.5 | 0.5 | 0.5 | 0.5 | 0.5 |
| | | Air temperature (° C.) | 40 | 40 | 40 | 40 | 40 | 40 | 40 | 40 |
| | Conductive heating | Rear surface platen (surface temperature of recording medium: ° C.) | — | — | — | — | — | — | — | — |
| | Radiation | Infrared radiation (surface temperature of recording medium: ° C.) | 50 | 50 | 50 | 50 | 50 | 50 | 50 | 50 |
| | | Water evaporation rate (%) in first ink layer and second ink layer | 95 | 95 | 95 | 95 | 95 | 95 | 95 | 95 |
| Second drying step (Post-drying step) | Air blowing | Surface air speed of recording medium (m/s) | — | — | — | — | — | — | — | 20 |
| | | Air temperature (° C.) | — | — | — | — | — | — | — | 90 |
| | Radiation | Infrared radiation (surface temperature of recording medium: ° C.) | — | — | — | — | — | — | — | 80 |
| Third drying step (Post-drying step) | Air blowing | Surface air speed of recording medium (m/s) | 20 | 20 | 20 | 20 | 20 | 20 | 20 | — |
| | | Air temperature (° C.) | 90 | 90 | 90 | 90 | 90 | 90 | 90 | — |
| | Radiation | Infrared radiation (surface temperature of recording medium: ° C.) | 80 | 80 | 80 | 80 | 80 | 80 | 80 | — |
| Image quality | | Bleeding | A | A | A | A | A | A | A | A |
| | | Cracks | B | B | B | B | C | C | C | B |
| Durability | | Adhesion (tape peeling) | B | D | A | B | D | B | B | A |
| | | Abrasion resistance | A | B | A | A | B | A | A | B |

TABLE 6

| | | | Comparative Examples | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| | | First ink layer | 1-(1) | 1-(1) | 1-(1) | 1-(1) | 1-(1) | 1-(1) | 1-(1) | 1-(1) | 1-(1) | 1-(2) | 1-(1) |
| | | Second ink layer | 2-(4) | 2-(5) | 2-(4) | 2-(4) | 2-(4) | 2-(5) | 2-(5) | 2-(4) | 2-(1) | 2-(2) | 2-(4) |
| | | Third ink layer | — | — | 3-(1) | 3-(4) | 3-(5) | 3-(4) | 3-(4) | — | — | 3-(2) | — |
| | | r2/r1 | 2.1 | 2.6 | 2.1 | 2.1 | 2.1 | 2.6 | 2.6 | 2.1 | 1.8 | 1.8 | 2.1 |
| | | r3/r1 | — | — | 1.6 | 2.0 | 2.4 | 2.0 | 2.0 | — | — | 1.9 | — |
| First drying step | Air blowing | Surface air speed of recording medium (m/s) | 0.5 | 0.5 | 0.5 | 0.5 | 0.5 | 0.5 | 0.5 | 0.5 | 0.5 | — | 0.5 |
| | | Air temperature (° C.) | 40 | 40 | 40 | 40 | 40 | 40 | 30 | 25 | 40 | — | 40 |
| | Conductive heating | Rear surface platen (surface temperature of recording medium: ° C.) | — | — | — | — | — | — | — | — | — | — | — |
| | Radiation | Infrared radiation (surface temperature of recording medium: ° C.) | 50 | 50 | 50 | 50 | 50 | 50 | 50 | — | — | — | 70 |
| | | Water evaporation rate (%) in first ink layer | 95 | 95 | 95 | 95 | 95 | 95 | 95 | 70 | 60 | 5 | 100 |
| Second drying step (First drying step 2) | Air blowing | Surface air speed of recording medium (m/s) | 0.5 | 0.5 | 0.5 | 0.5 | 0.5 | 0.5 | 0.5 | 0.5 | 0.5 | 0.5 | 0.5 |
| | | Air temperature (° C.) | 40 | 40 | 40 | 40 | 40 | 40 | 40 | 40 | 40 | 40 | 40 |
| | Conductive heating | Rear surface platen (surface temperature of recording medium: ° C.) | — | — | — | — | — | — | — | — | — | — | — |
| | Radiation | Infrared radiation (surface temperature of recording medium: ° C.) | 50 | 50 | 50 | 50 | 50 | 50 | 50 | 50 | 50 | 50 | 50 |
| | | Water evaporation rate (%) in first ink layer and second ink layer | 95 | 95 | 95 | 95 | 95 | 95 | 95 | 95 | 95 | 95 | 95 |
| Second drying step (Post-drying step) | Air blowing | Surface air speed of recording medium (m/s) | 20 | 20 | — | — | — | — | — | 20 | 20 | — | 20 |
| | | Air temperature (° C.) | 90 | 90 | — | — | — | — | — | 90 | 90 | — | 90 |
| | Radiation | Infrared radiation (surface temperature of recording medium: ° C.) | 80 | 80 | — | — | — | — | — | 80 | 80 | — | 80 |

TABLE 6-continued

| | | | Comparative Examples | | | | | | | | | | |
|---|---|---|---|---|---|---|---|---|---|---|---|---|---|
| | | | 1 | 2 | 3 | 4 | 5 | 6 | 7 | 8 | 9 | 10 | 11 |
| Third drying step (Post-drying step) | Air blowing | Surface air speed of recording medium (m/s) | — | — | 20 | 20 | 20 | 20 | 20 | — | — | 20 | — |
| | | Air temperature (° C.) | — | — | 90 | 90 | 90 | 90 | 90 | — | — | 90 | — |
| | Radiation | Infrared radiation (surface temperature of recording medium: ° C.) | — | — | 80 | 80 | 80 | 80 | 80 | — | — | 80 | — |
| Image quality | | Bleeding | B | C | B | C | D | D | D | D | D | D | A |
| | | Cracks | D | D | D | D | D | D | D | D | C | B | D |
| Durability | | Adhesion (tape peeling) | D | D | D | D | D | D | D | D | D | B | D |
| | | Abrasion resistance | C | D | B | C | D | D | D | C | C | B | C |

11.3. Evaluation of Recorded Materials

The obtained recorded products of each Example and Comparative Example were evaluated according to the following criteria. In addition, the results are shown in Tables 2 to 6.

11.3.1. Evaluation of Bleeding

Bleeding was evaluated as one type of image quality evaluation by visual observation from the recording surface side of the recorded material. The evaluation criteria are as follows.

A: There is no bleeding/color mixing between any of the ink layers

B: There is slight bleeding/color mixing between any of the ink layers

C: There is obvious bleeding/color mixing between any of the ink layers

D: There is remarkable bleeding/color mixing between any of the ink layers 11.3.2. Evaluation of Cracks Cracks were evaluated as one type of image quality evaluation by visual observation from the recording surface side of the recorded material. The evaluation criteria are as follows. Note that, in Example 10, since the first ink layer is a color image portion and the second ink layer is a white image portion, evaluation results are shown with the "second ink layer (color image portion)" of the following evaluation criteria switched to the "second ink layer (white image portion)", and the "first ink layer (white image portion)" switched to "the first ink layer (color image portion)".

A: There is no cracking in the second ink layer (color image portion) at all

B: Due to cracks on the surface of the second ink layer (color image portion), the first ink layer (white image portion) is slightly visible at places under the second ink layer C: Due to cracks on the surface of the second ink layer (color image portion), the first ink layer (white image portion) is visible to a considerable extent under the second ink layer D: The first ink layer (white image portion) below the second ink layer (color image portion) is cracked such that the recording medium is visible at places 11.3.3. Adhesion Evaluation After the recorded material was left to stand in a laboratory in an environment of 20° C. to 25° C./40% RH to 60% RH for 5 hours, a transparent adhesive tape (trade name: Transparent beautiful color, manufactured by Sumitomo 3M Ltd.) was attached to the recording surface (image forming portion) of the recorded material. Then, by peeling the attached tape by hand and confirming the ink peeling on the recording surface and the state of ink transfer to the tape, the adhesion (durability) was evaluated based on the tape releasability (peeling resistance). The evaluation criteria for adhesion are as follows.

A: There is no image peeling and no ink attachment to the tape

B: There is no image peeling and slight ink attachment to the tape

C: Image peeling and ink attachment to the tape are observed

D: The image is entirely peeled off 11.3.4. Abrasion Resistance Evaluation

After the recorded material was left to stand in a laboratory in an environment of 20° C. to 25° C./40% RH to 60% RH for 5 hours, by confirming the ink peeling state of the recording surface or the ink transfer state to the cloth when the recording surface (image forming portion) of the recorded material was rubbed 20 times with a cloth under a load of 200 g using a color fastness rubbing tester AB-301 (trade name, manufactured by Tester Sangyo Co., Ltd.), the abrasion resistance (durability) was evaluated. The evaluation criteria for the abrasion resistance are as follows.

A: There are no rubbing traces on the image and no ink attachment to the cloth

B: There are rubbing traces on the image and slight ink attachment to the cloth

C: Rubbing traces on the image and ink attachment to the cloth are observed

D: The image is peeled and the ink attachment to the cloth is remarkable 11.4. Evaluation Results The above evaluation results are shown in Tables 2 to 6.

According to the evaluation results of the Examples in Tables 2 to 5, the recorded material of all the Examples was excellent in the evaluation of bleeding and cracking. It may be considered that this is caused by both the fact that the value of "r2/r1" is 2 or less, the composition balance of the first ink composition and the second ink composition is favorable and the fact that the water on the recording medium at the finishing point of the first drying step and/or the second drying step (the first drying step 2) was evaporated by 80% by mass or more.

In Example 10, the value of "r2/r1" was as small as 0.6, but it was found that recorded material with a high image quality was obtained although the cracking evaluation was slightly inferior.

In addition, in Example 38, although the cracking evaluation was slightly inferior, high quality image recorded material was obtained, but it is considered that this is because the content of the water-soluble organic solvent (together with the solid content) of the first ink composition was increased while the value of "r2/r1" with the second ink layer on the first ink layer was in a range from 0.5 or more and 2 or less, thus the cracking was favorable.

In addition, when comparing Examples 1 to 3, in a case where the water evaporation rate of the first ink in the first drying step was relatively low, it was found that the crack resistance slightly decreased; however, on the other hand, it was found that it is possible to lower the surface temperature of the recording medium in the first drying step. In addition, it was found that, in the order of Example 1, 2, and 3, the ejection stability of the recording head used in the first ink layer forming step was excellent. After continuously performing a recorded material creation test for 60 minutes, a test was performed confirming the flying deflection of the recording head used in the first ink layer forming step and the generation of defective nozzles of the non-ejecting nozzles, and the ejection stability was determined from the rate of defective nozzle generation. From this, it was found that a case where the surface temperature of the recording medium is relatively low is preferable since the heat transferred to the recording medium in the first drying step is small and there are few problems such as ejection failures being generated by the heat generated in the first drying step reaching the nozzles. In addition, it was found that there was also a tendency for the time necessary for the first drying step to be shortened. From this, it was found that the recording method of the present Example was superior in that it is possible to perform recording with excellent crack resistance even in a case where the water evaporation rate of the first ink in the first drying step is relatively low.

On the other hand, since the value of "r2/r1" is more than 2 or the water on the recording medium at the finishing point of the first drying step is less than 80% by mass evaporated, the recorded material according to Comparative Example 1 to Comparative Example 10 in Table 6 was insufficient in the evaluation of bleeding and cracking (particularly cracking).

Note that, in the recorded material according to Comparative Example 11, the initial value of "r2/r1" in the ink composition itself was more than 2, but, in the first drying step after printing the first ink layer, since the evaporation amount of the water was high in comparison with that of the other examples and the liquid component was reduced, the bleeding of the second ink layer was favorable. However, on the other hand, it is assumed that the evaporation of a part of the water-soluble organic solvent also proceeded to a greater extent than in the other examples and the value of r1 after the first drying step was lower than the initial value of the first ink itself, thus it is inferred that the value of "r2/r1" between ink layers on the recording medium was higher than the initial value and cracks were generated more remarkably in the second drying step (post-drying step).

Next, looking at the evaluation results of the durability, from the comparison of Examples 4 and 10, the abrasion resistance test results were particularly improved by using the ink composition using the acrylic-based resin for the second ink layer.

In addition, by using the recorded material having the third ink layer, the abrasion resistance test results were overall more favorable than the recorded material having no third ink layer.

In addition, among the Examples, from the comparison of Examples 3, 4, and 7, in the example in which urethane-based resin particles or ester-based resin particles were used for the ink composition used for the first ink layer, the abrasion resistance was extremely favorable.

In Comparative Example 10, since urethane-based resin particles are used for the ink composition used in the first ink layer of the Example, the adhesion of the recorded material subjected to the third drying step (post-drying step) was favorable, but bleeding occurred remarkably since printing of the second ink layer was performed at the stage where the drying of the first ink layer was insufficient (water evaporation rate was 5% by mass) in the first drying step.

Further, from the comparison of Examples 3, 4, and 7, it was found that Examples including urethane-based resin particles or ester-based resin particles in the ink composition used for the first ink layer in the Examples had an adhesion of B or more. This is considered to be due to the fact that these resin particles exhibited excellent adhesion to the soft packaging film and the adhesion of the whole image was favorable.

Furthermore, in a case where the second ink layer is overlap printed on the first ink layer (first ink composition 1-(2)) including resin particles with low Tg, or in a case where the second ink layer and the third ink layer are overlap printed, a tendency was seen for the abrasion resistance to be improved by forming the second ink layer or the third ink layer with an ink composition containing resin particles with a high Tg (refer to Examples 4, 5, 6, 12, 15, 18, 21, 24, 27, 30, 33, 36, and Comparative Example 10).

The same tendency is also seen in a case where the second ink layer or the third ink layer is formed by an ink composition including resin particles with a higher Tg on the first ink layer (first ink composition 1-(3), 1-(4)) including resin particles with low Tg, and it was found that the abrasion resistance was improved (refer to Examples 7, 13, 16, 19, 22, 31, and 38).

These facts suggest that the abrasion resistance is improved by forming the ink layer on the surface side using resin particles having a higher Tg.

Furthermore, also in a case where the resin particles of the first ink layer are formed of ester-based resin particles and, with respect thereto, the second ink layer or the third ink layer is formed of an ink composition including the same type of ester-based resin particles, a tendency for the durability to improve was seen (refer to Examples 8, 9, 16, 19, 22, 25, 28, 31, 34, and 37). This suggests that by overlap printing the ink compositions including the ester-based resin particles, the bonding strength between the ink layers is increased.

The present invention is not limited to the embodiment described above, and various modifications are possible. For example, the present invention includes configurations substantially the same as described in the embodiments (for example, configurations having the same function, method, and results, or configurations having the same object and effects). In addition, the present invention includes configurations in which non-essential portions of the configurations described in the embodiments are replaced. In addition, the present invention includes configurations which achieve the same operation and effects as the configuration described in the embodiments, or configurations which achieve the same object. In addition, the present invention includes configurations in which a well-known technique is added to the configuration described in the embodiments.

The invention claimed is:

1. An ink jet recording method comprising:

a step of forming a first ink layer by ejecting a first ink composition which includes water, a water-soluble organic solvent, and a solid content including at least a coloring material on a recording medium by an ink jet method;

a first drying step of evaporating 80% by mass or more of water contained in the first ink composition in the first ink layer;

a step of forming a second ink layer by ejecting a second ink composition which includes water, a water-soluble organic solvent, and a solid content including at least a coloring material on the first ink layer subjected to the first drying step by an ink jet method; and a second drying step of evaporating a volatile component on the recording medium in the recording medium subjected to the step of forming a second ink layer, wherein when a ratio of a content of the water soluble organic solvent of the first ink composition to the solid content of the first ink composition is r1, and a ratio of a content of the water soluble organic solvent of the second ink composition to the solid content of the second ink composition is r2, a ratio of r2/r1 is 2 or less.

2. The ink jet recording method according to claim 1, wherein the recording medium is a low ink absorption or non-ink absorption recording medium.

3. The ink jet recording method according to claim 1, wherein the first ink composition is a background image ink composition containing at least one of metal compound particles and metal particles as a coloring material, and the second ink composition is a colored ink composition which includes a non-white coloring material.

4. The ink jet recording method according to claim 1, wherein the first drying step is performed with a surface temperature of the recording medium of 25° C. or more and 50° C. or less.

5. The ink jet recording method according to claim 1, wherein the first ink composition includes resin particles as the solid content.

6. The ink jet recording method according to claim 5, wherein the resin particles are at least one type of urethane-based resin particles, ester-based resin particles, and acrylic-based resin particles.

7. The ink jet recording method according to claim 6, wherein the ester-based resin particles include a polyester resin which is a graft polymer formed of a main chain segment (A1) formed of a polyester resin and a side chain segment (A2) formed of an addition polymerization resin.

8. The ink jet recording method according to claim 5, wherein the first ink composition includes at least one type of urethane-based resin particles and ester-based resin particles, and the second ink composition includes at least one type of ester-based resin particles and acrylic-based resin particles.

9. The ink jet recording method according to claim 1, wherein the second ink composition includes resin particles as the solid content.

10. The ink jet recording method according to claim 1, wherein "r2/r1" is 0.5 or more and 2 or less.

11. The ink jet recording method according to claim 1, wherein the first drying step is performed with an evaporation amount of the water-soluble organic solvent contained in the first ink composition in the first ink layer of 20% by mass or less.

12. The ink jet recording method according to claim 1, wherein the first drying step is performed by at least one of heat conduction, radiation irradiation, and air blowing.

13. The ink jet recording method according to claim 1, wherein the second drying step is performed with a surface temperature of the recording medium at 70° C. or more.

14. The ink jet recording method according to claim 1, further comprising:

a step of forming a third ink layer by ejecting a clear ink composition including resin particles, a water-soluble organic solvent, and water on the second ink layer by an ink jet method after performing the second drying step.

15. The ink jet recording method according to claim 14, wherein when a ratio of a content of the water soluble organic solvent of the clear ink composition to a solid content of the clear ink composition is r3, a ratio of r3/r1 is 2 or less.

16. The ink jet recording method according to claim 14, wherein the step of forming a third ink layer is performed after evaporating 80% by mass or more of all water contained in the first ink composition and the second ink composition in the second drying step.

17. The ink jet recording method according to claim 14, wherein a third drying step of evaporating a volatile component on the recording medium is performed after the step of forming a third ink layer.

18. The ink jet recording method according to claim 1, wherein the first ink composition and the second ink composition include 1% by mass or more and 15% by mass or less of resin particles, 3% by mass or more and 40% by mass or less of a water-soluble organic solvent, and 0.5% by mass or more and 15% by mass or less of a coloring material.

19. The ink jet recording method according to claim 1, wherein the water-soluble organic solvent includes a water-soluble organic solvent with a boiling point of 250° C. or less.

* * * * *